(12) United States Patent
Kim et al.

(10) Patent No.: US 11,200,247 B2
(45) Date of Patent: *Dec. 14, 2021

(54) METHOD AND SYSTEM FOR KEYWORD SEARCH USING MESSAGING SERVICE

(71) Applicant: LINE Corporation, Tokyo (JP)

(72) Inventors: Jiwon Kim, Seongnam-si (KR); Taegyu Yoo, Seongnam-si (KR); Seung Hwan Lee, Seongnam-si (KR); Hyun ju Yi, Seongnam-si (KR); Yong-Hun Lee, Seongnam-si (KR); Eunhee Min, Seongnam-si (KR); Chanil Kim, Seongnam-si (KR)

(73) Assignee: LINE CORPORATION, Tokyo (JP)

(*) Notice: Subject to any disclaimer, the term of this patent is extended or adjusted under 35 U.S.C. 154(b) by 44 days.

This patent is subject to a terminal disclaimer.

(21) Appl. No.: 16/552,103

(22) Filed: Aug. 27, 2019

(65) Prior Publication Data

US 2019/0384760 A1 Dec. 19, 2019

Related U.S. Application Data

(63) Continuation of application No. 15/481,940, filed on Apr. 7, 2017, now Pat. No. 10,445,333.

(30) Foreign Application Priority Data

Apr. 14, 2016 (KR) .................. 10-2016-0045739

(51) Int. Cl.
*G06F 3/048* (2013.01)
*G06F 16/248* (2019.01)
(Continued)

(52) U.S. Cl.
CPC .......... *G06F 16/248* (2019.01); *G06F 3/0482* (2013.01); *H04L 51/04* (2013.01); *H04L 51/046* (2013.01); *H04L 51/16* (2013.01)

(58) Field of Classification Search
CPC .......... G06F 16/95; G06F 16/24; G06F 3/048; G06F 3/00; G06F 16/248; G06F 3/0482; H04L 51/04; H04L 51/046; H04L 51/16
See application file for complete search history.

(56) References Cited

U.S. PATENT DOCUMENTS 9,384,244 B1* 7/2016 Garg ................ G06F 16/90324
2005/0234883 A1 10/2005 Szeto et al.
(Continued)

FOREIGN PATENT DOCUMENTS

JP    H 08-006963 A    1/1996
JP    2014-142919 A    8/2014
(Continued)

OTHER PUBLICATIONS

Taiwanese Office Action and Search Report dated Nov. 6, 2018 issued in Taiwanese Application No. 106111759.
(Continued)

*Primary Examiner* — Hugo Molina
(74) *Attorney, Agent, or Firm* — Harness, Dickey & Pierce, P.L.C.

(57) ABSTRACT

Methods and systems for a keyword search using a messenger service provide a search result to users based on instant messages transmitted and received through a messenger service.

19 Claims, 22 Drawing Sheets

(51) Int. Cl.
*H04L 12/58* (2006.01)
*G06F 3/0482* (2013.01)

(56) References Cited

U.S. PATENT DOCUMENTS

| | | |
|---|---|---|
| 2006/0069664 A1 | 3/2006 | Ling et al. |
| 2006/0294189 A1 | 12/2006 | Natarajan et al. |
| 2008/0140779 A1 | 6/2008 | Ahn et al. |
| 2010/0058200 A1* | 3/2010 | Jablokov .............. G10L 13/033 715/752 |
| 2010/0161618 A1 | 6/2010 | Kim et al. |
| 2012/0084315 A1* | 4/2012 | Schneider ......... G06F 16/24545 707/769 |
| 2013/0260893 A1 | 10/2013 | Shin et al. |
| 2013/0332543 A1 | 12/2013 | Shin et al. |
| 2014/0019540 A1 | 1/2014 | Shin et al. |
| 2014/0195527 A1* | 7/2014 | Kim ..................... G06F 16/951 707/723 |
| 2014/0207882 A1* | 7/2014 | Joo ....................... H04L 51/02 709/206 |
| 2015/0128022 A1* | 5/2015 | Hong .................. G06F 16/9032 715/234 |
| 2016/0004784 A1 | 1/2016 | Roh et al. |
| 2016/0036751 A1* | 2/2016 | Ban ....................... H04L 51/06 455/414.1 |
| 2016/0330150 A1 | 11/2016 | Joe et al. |
| 2017/0098000 A1* | 4/2017 | Paris .................. G06F 16/9537 |

FOREIGN PATENT DOCUMENTS

| | | |
|---|---|---|
| KR | 100397639 B1 | 9/2003 |
| KR | 10-2006-0119836 A | 11/2006 |
| KR | 20080078431 A | 8/2008 |
| KR | 100910515 B1 | 7/2009 |
| KR | 20150106180 A | 9/2015 |
| TW | I402700 B1 | 7/2013 |
| TW | I456410 B | 10/2014 |
| TW | I477996 B | 3/2015 |
| WO | WO-2015065001 A1 | 5/2015 |

OTHER PUBLICATIONS

Taiwanese Office Action dated Apr. 12, 2019 issued in corresponding Taiwanese Application No. 106111759.
Japanese Office Action dated Jan. 5, 2021 issued in corresponding Japanese Patent Application No. 2017-073506.

* cited by examiner

METHOD AND SYSTEM FOR KEYWORD SEARCH USING MESSAGING SERVICE

CROSS-REFERENCE TO RELATED APPLICATION(S)

This application is a continuation of U.S. application Ser. No. 15/481,940, filed on Apr. 7, 2017, which claims priority under 35 U.S.C. § 119 to Korean Patent Application No. 10-2016-0045739, filed on Apr. 14, 2016 in the Korean Intellectual Property Office (KIPO), the entire contents of each of which are incorporated herein by reference.

BACKGROUND

Field

One or more example embodiments relate to methods and/or systems for a keyword search using a messenger service.

Description of Related Art

In some related arts, a query of a user may be responded in a web environment or a mobile environment. For example, a search engine refers to software that helps a user to easily retrieve desired information from a mass amount of materials scattered on the Internet. The search engine provides a user with a document or a site suitable for a query of the user (e.g., a keyword or a search condition) as an answer.

According to some technologies, for providing a search result may be generated by using a message that is input to a conversation window of a chatroom for receiving an instant message in association with the aforementioned search technique, as a keyword. For example, Korean Patent Publication No. 10-2006-0119836 discloses an example of such search result sharing methods and/or systems using a messenger. Specifically, this Korean Patent Application discloses a technology for providing a search result by using a message of a specific condition input from a user to a messenger as a keyword.

SUMMARY

One or more example embodiments provide keyword search methods and/or systems that provide a search result associated with a specific conversation session at a messaging service, instead of providing a search result simply using a keyword input from a user.

According to an example embodiment, a non-transitory computer-readable medium storing a computer program, which when executed by a processor of an electronic device, configures the processor to perform a keyword search method comprising displaying one or more instant messages transmitted and received through a conversation session on a screen of the electronic device through a messenger interface, the messenger interface being an interface configured to set the conversation session between an account of a user of the electronic device and an account of another user, transmitting at least a portion of the one or more instant messages transmitted and received through the conversation session to a server for a keyword search in response to an input of a search instruction, receiving a search result from the server, the search result generated based on a keyword extracted from the transmitted at least a portion of the one or more instant messages, and displaying the received search result on the screen According to an example embodiment, a keyword search method of an electronic device includes displaying one or more instant messages transmitted and received through a conversation session on a screen of the electronic device through a messenger interface, the messenger interface being an interface configured to set between an account of a user of the electronic device and an account of another user, transmitting at least a portion of the one or more instant messages transmitted and received through the conversation session to a server for a keyword search in response to an input of a search instruction, receiving a search result, from the server, the search result based on a keyword extracted from the transmitted at least a portion of the one or more instant messages, and displaying the received search result on the screen.

According to an example embodiment, a keyword search method of a server includes receiving, from an electronic device, at least a portion of one or more instant messages transmitted and received through a conversation session set between an account of a user of an electronic device and an account of another user, extracting a keyword from the received at least a portion of the one or more instant messages, generating a search result using the extracted keyword; and transmitting the generated search result to the electronic device Further areas of applicability will become apparent from the description provided herein. The description and specific example embodiments in this disclosure are intended for purposes of illustration only and are not intended to limit the scope of the present disclosure.

BRIEF DESCRIPTION OF THE DRAWINGS

Example embodiments will be described in more detail with regard to the following figures, wherein like reference numerals refer to like parts throughout the various figures unless otherwise specified, and wherein.

Figure 1:
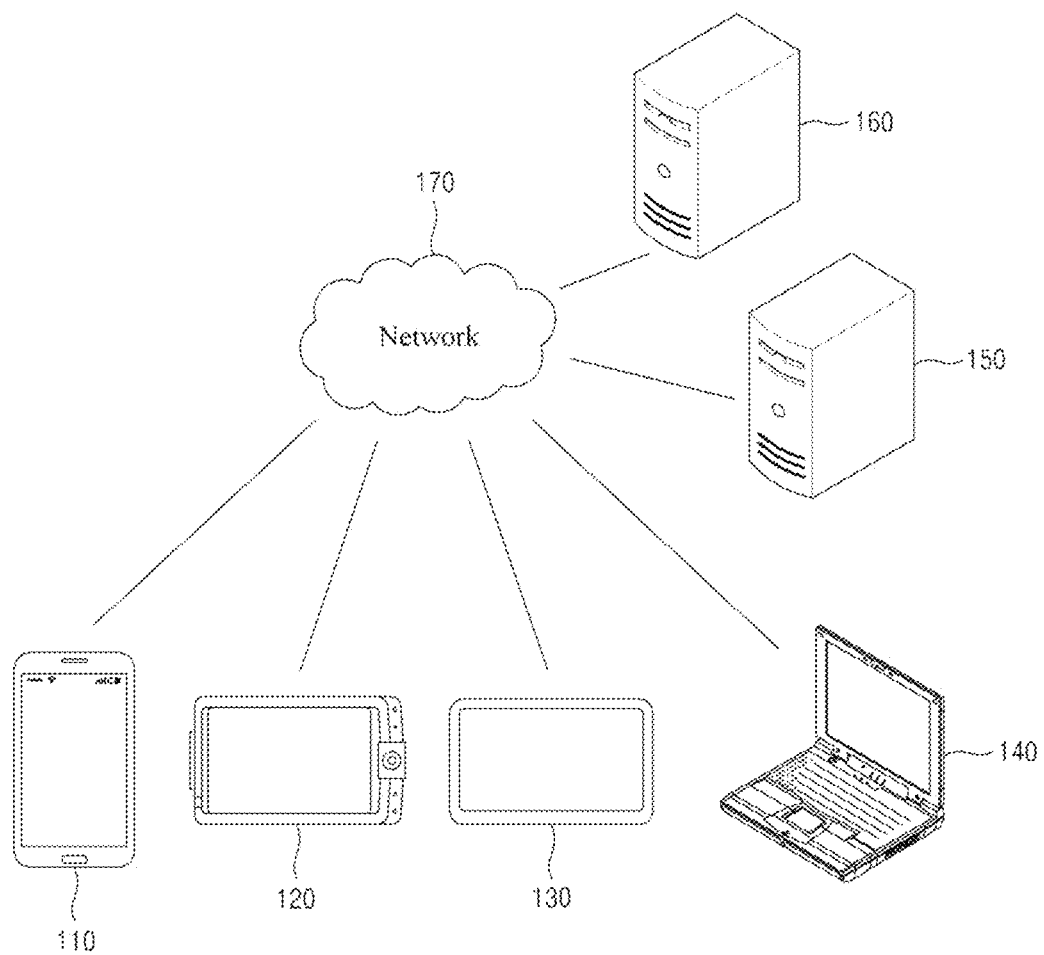
FIG. 1 is a diagram illustrating an example of a network environment according to an example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to the illustrated example embodiments. Rather, the illustrated example embodiments are provided as examples so that this disclosure will be thorough and complete, and will fully convey the concepts of this disclosure to those skilled in the art. Known processes, elements, and techniques may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to an example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, navigation, a computer, a laptop computer, a digital broadcasting terminal, a personal digital assistant (PDA), a portable multimedia player (PMP), a tablet personal computer (PC), and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the electronic device 110 may connect to the server 150 through an application installed on the electronic device 110, and may be provided with a desired (or alternatively, preset) service, for example, a game service, a chat service, a social network service (SNS), a financial service, and the like.

Figure 2:
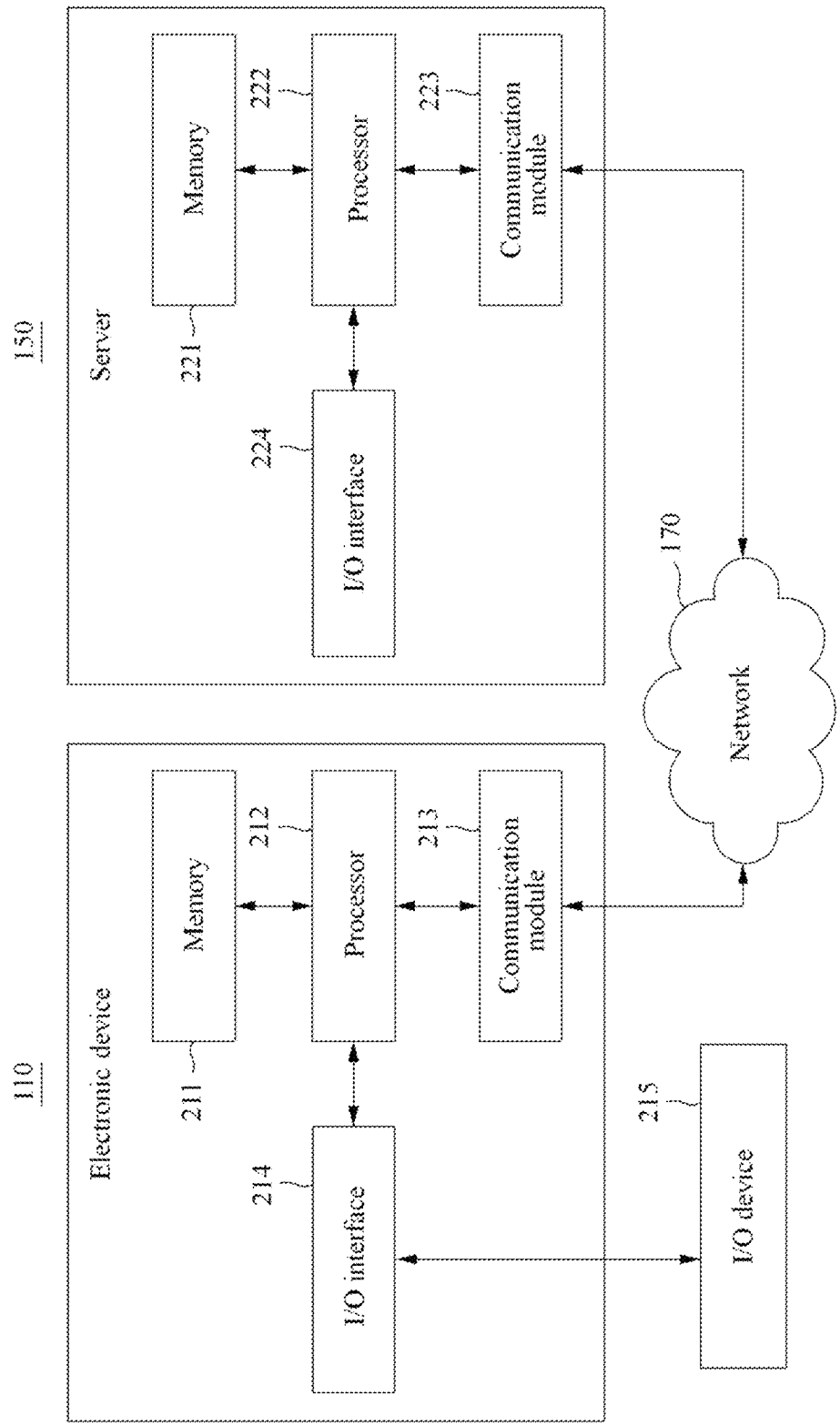
FIG. 2 is a block diagram illustrating an example of a configuration of an electronic device and a server according to an example embodiment.

FIG. 2 is a block diagram illustrating an example of a configuration of an electronic device and a server according to an example embodiment. FIG. 2 illustrates a configuration of the electronic device 110 as an example for a single electronic device and illustrates a configuration of the server 150 as an example for a single server. The same or similar constituent elements may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device (e.g., random access memory (RAM), read only memory (ROM), or a disk drive) as a computer-readable storage medium. Here, ROM and the permanent mass storage device may be included as a separate permanent storage device separate from the memory 211, 221. Also, an OS and at least one program code, for example, a code for an application for providing a specific service, a browser, etc., installed and executed on the electronic device 110, may be stored in the memory 211, 221. Such software constituent elements may be loaded from another computer-readable storage medium separate from the memory 211, 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211, 221 through the communication module 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a request for a video call service, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further included in the electronic device 110.

The I/O interface 214, 224 may be a device used for interface with an I/O device 215. For example, an input device may include a keyboard, a mouse, etc., and an output device may include a display for displaying a communication session of an application. The I/O interface 214 may be a device for interface with an apparatus in which an input function and an output function are integrated into a single function, for example, a touch screen. For example, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O device 215, or may further include other constituent elements, for example, a transceiver, a global positioning system (GPS) module, a camera, a variety of sensors, a database, and the like. In detail, if the electronic device 110 is a smartphone, the electronic device 110 may be configured to further include a variety of constituent elements, for example, an accelerometer sensor, a gyro sensor, a camera, various physical buttons, a button using a touch panel, an I/O port, a vibrator for vibration, etc., which are generally included in the smartphone.

Figure 3:
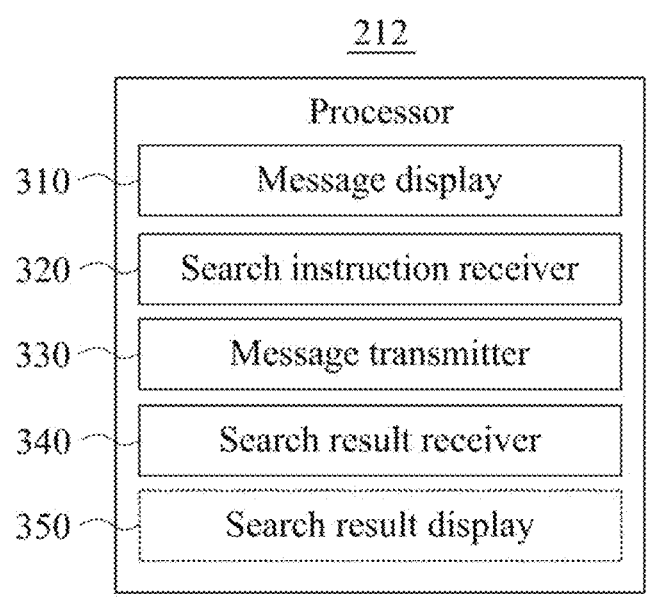
FIG. 3 is a block diagram illustrating an example of constituent elements included in a processor of an electronic device according to an example embodiment.
Figure 4:
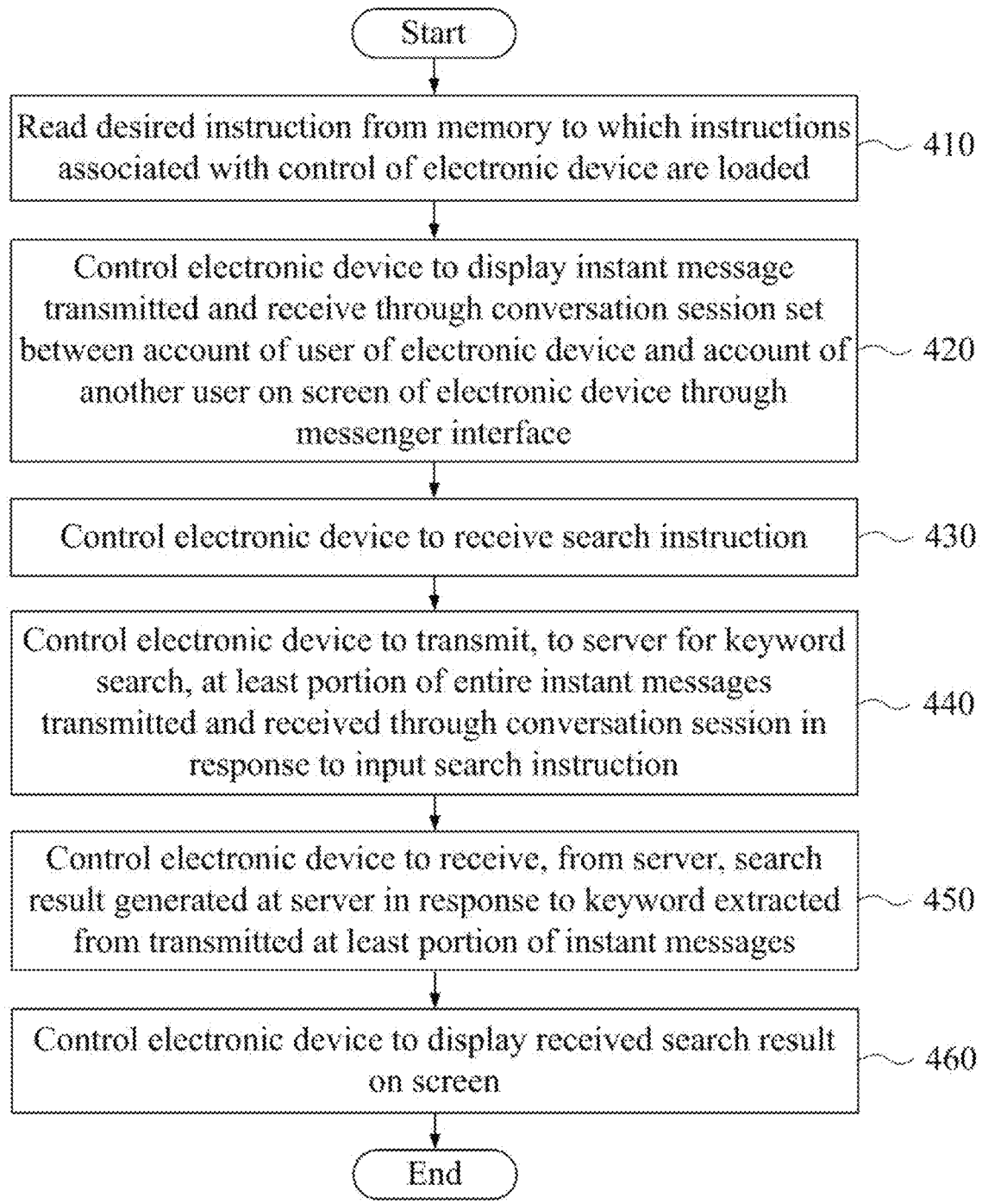
FIG. 4 is a flowchart illustrating an example of a method performed at an electronic device according to an example embodiment.

FIG. 3 is a diagram illustrating an example of constituent elements included in a processor of an electronic device according to an example embodiment, and FIG. 4 is a flowchart illustrating an example of a method performed at an electronic device according to an example embodiment.

A keyword search system configured as a computer may be constructed in the electronic device 110 according to an example embodiment. For example, in response to an instruction provided from a messenger application installed on the electronic device 110, the keyword search system constructed in the electronic device 110 may perform a keyword search method. To perform the keyword search method of FIG. 4, referring to FIG. 3, the processor 212 of the electronic device 110 may include a message display 310, a search instruction receiver 320, a message transmitter 330, a search result receiver 340, and a search result display 350 as constituent elements. Depending on example embodiments, the constituent elements of the processor 212 may be selectively included in or excluded from the processor 212. Also, depending on example embodiments, the constituent elements of the processor 212 may be separate from or integrated with each other to represent functions of the processor 212.

The processor 212 and the constituent elements of the processor 212 may control the electronic device 110 to perform operations 410 through 460 included in the keyword search method of FIG. 4. For example, the processor 212 and the constituent elements of the processor 212 may be configured to execute instructions according to a code of at least one program and a code of an OS included in the memory 211.

Here, the constituent elements of the processor 212 may be representations of different functions performed at the processor 212 in response to an instruction provided from the program code stored on the electronic device 110 (e.g., an instruction provided from a messenger application executed on the electronic device 110). For example, the message display 310 may be used as a functional representation of the processor 212 that controls the electronic device 110 to display an instant message on a screen in response to the instruction.

In operation 410, the processor 212 may read a desired instruction from the memory 211 to which instructions associated with control of the electronic device 110 are loaded. In this case, the read instruction may include an instruction for controlling the processor 212 to perform operations 420 through 460.

In operation 420, the message display 310 may control the electronic device 110 to display an instant message transmitted and received through a conversation session set between an account of a user of the electronic device 110 and an account of another user on a screen of the electronic device 110 through a messenger interface. For example, the other user may be a user of the electronic device 120. In this case, instant messages for conversation may be transmitted and received between the electronic device 110 and the electronic device 120 using a messaging service. The instant messages may be transmitted and received through the conversation session set between the account of the user of the electronic device 110 and the account of the user of the electronic device 120. In this case, a messenger server, for example, the server 160, providing the messing service may route transmission of the instant messages to be transferred to participants of the conversation session. The entire instant messages transmitted and received through the conversation session may be stored in the electronic device 110, and a plurality of conversation sessions may be present. In response to selecting a previous conversation session or generating a new conversation session, the electronic device 110 may display at least a portion of the entire instant messages transmitted and received through a corresponding conversation session on the screen of the electronic device 110 through a messenger interface. For example, a chatroom of a messenger may correspond to the conversation session.

In operation 430, the search instruction receiver 320 may control the electronic device 110 to receive a search instruction. The search instruction may be generated and input using a variety of methods. For example, the search instruction receiver 320 may receive the search instruction through a user selection on a desired (or alternatively, preset) area of the messenger interface, for example, a user touch on an area on which a button is displayed using a finger. As another example, the search instruction receiver 320 may receive a search instruction generated based on an output value of a sensor included in the electronic device 110. An example of generating and receiving the search instruction will be further described.

In operation 440, the message transmitter 330 may control the electronic device 110 to transmit to the server 150 for a keyword search at least a portion of the entire instant messages transmitted and received through the conversation session in response to the input search instruction. The server 150 for the keyword search may be the same server as the aforementioned messenger server or may be a server different from the messenger server. For example, in response to the input search instruction, the electronic device 110 may transmit at least a portion of instant messages associated with a chatroom currently being displayed to the server 150 for the keyword search over the network 170. The at least a portion of instant messages may be transmitted from the electronic device 110 to the server 150 over the network 170 separate from the conversation session.

In the example embodiments, that the electronic device 110 transmits an instant message to the server 150 may indicate that the electronic device 110 transmits the corresponding instant message itself to the server 150, and/or may indicate that the electronic device 110 transmits an identifier of the corresponding instant message to the server 150. For example, if the instant message is stored even in the server 150, the corresponding instant message may be recognized at the server 150 based on the identifier of the instant message transmitted from the electronic device 110.

In operation 450, the search result receiver 340 may control the electronic device 110 to receive, from the server 150, a search result generated at the server 150 based on a keyword extracted from the transmitted at least a portion of instant messages. For example, the server 150 may extract a keyword from an instant message associated with a specific conversation session provided from the electronic device 110, generate a search result based on the extracted keyword (instead of generating a search result using an explicitly provided keyword, and transmit the generated search result to the electronic device 110 over the network 170.

In some example embodiments, the server 150 may generate a search result using a keyword selected by the user from among the extracted keywords. For example, if a plurality of keywords is extracted from an instant message associated with a specific conversation, the server 150 may transmit a list of keywords to the electronic device 110 over the network 170. The electronic device 110 may display the received list of keywords on the screen of the electronic device 110 and may provide the user with a user interface for selecting at least one keyword from the list of keywords. Also, the electronic device 110 may recognize the keyword selected by the user through the user interface and may transmit the recognized keyword to the server 150 over the network 170. In this case, the server 150 may generate a search result using the keyword selected by the user, and may transmit the generated search result to the electronic device 110 over the network 170.

In operation 460, the search result display 350 may control the electronic device 110 to display the received search result on the screen. The user may receive search result(s) associated with instant messages transmitted and received through a conversation session currently in use, instead of receiving a search result associated with a keyword input from the user.

Figure 5:
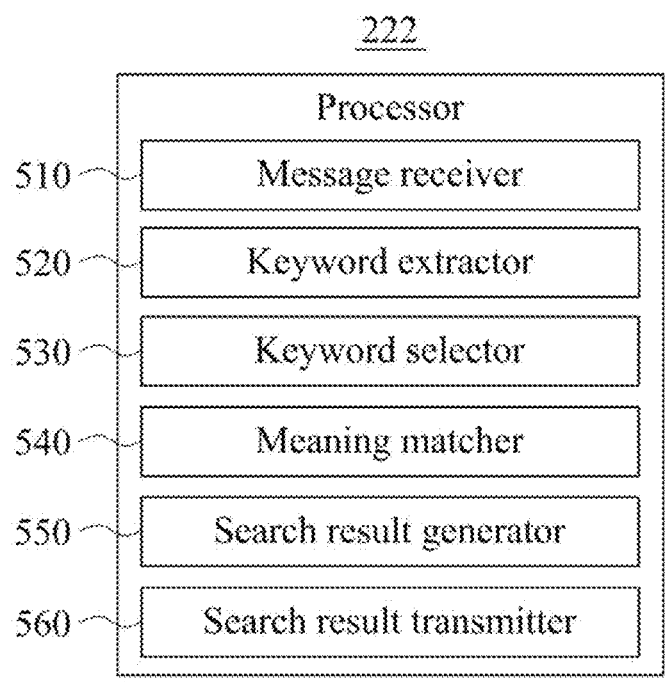
FIG. 5 is a block diagram illustrating an example of constituent elements included in a processor of a server according to an example embodiment.
Figure 6:
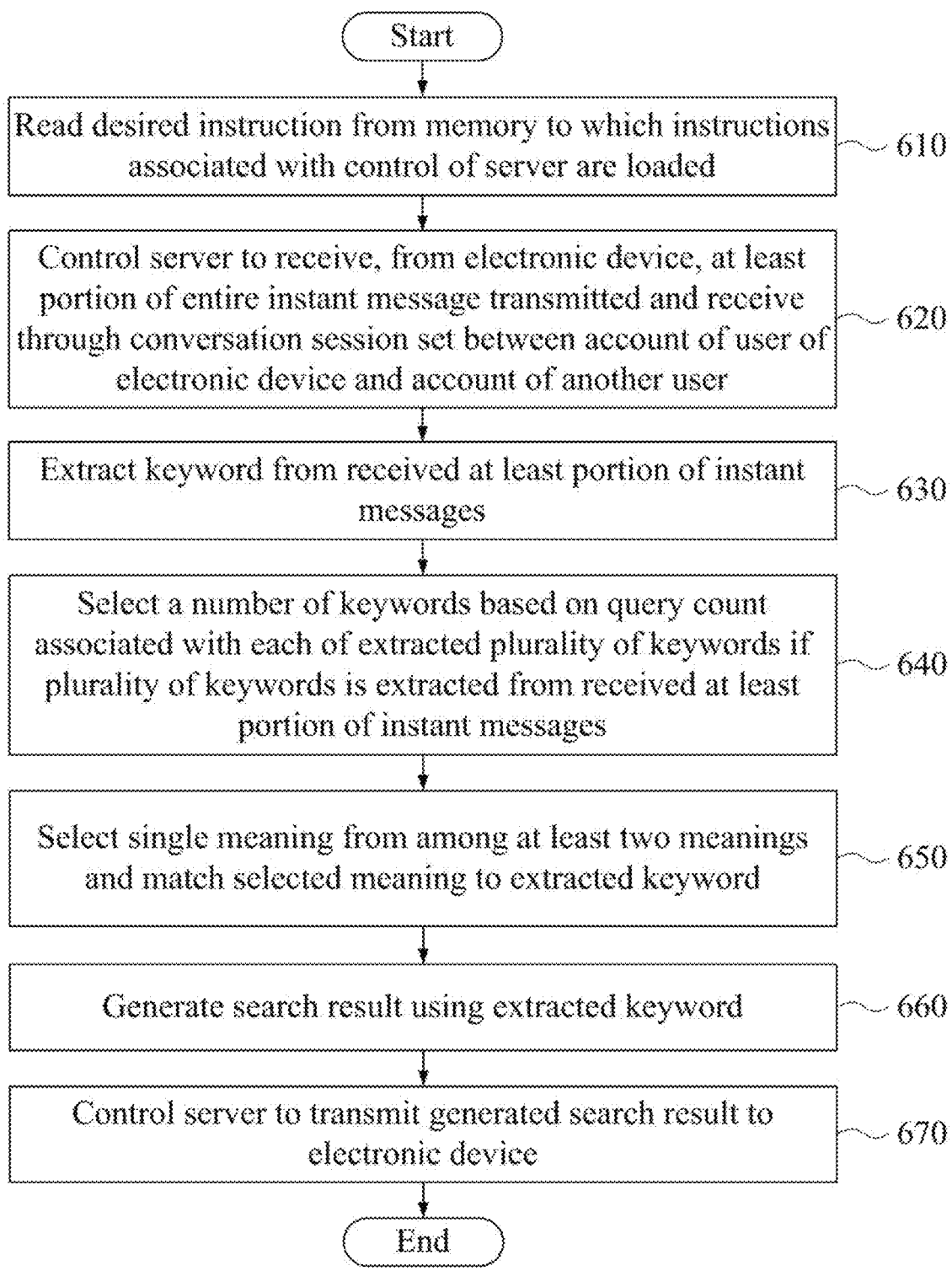
FIG. 6 is a flowchart illustrating a method performed at a server according to an example embodiment.

FIG. 5 is a block diagram illustrating an example of constituent elements included in a processor of a server according to an example embodiment, and FIG. 6 is a flowchart illustrating a method performed at a server according to an example embodiment.

A keyword search system configured as a computer may be constructed in the server 150 according to an example embodiment. The keyword search system constructed in the server 150 may perform the keyword search method of FIG. 6. To perform the keyword search method of FIG. 6, referring to FIG. 5, the processor 222 of the server 150 may include a message receiver 510, a keyword extractor 520, a keyword selector 530, a meaning matcher 540, a search result generator 550, and a search result transmitter 560. Depending on example embodiments, the constituent elements of the processor 222 may be selectively included in or excluded from the processor 222. Also, the constituent elements of the processor 222 may be separate from or merged (or integrated) with each other to represent functions of the processor 222.

The processor 222 and the constituent elements of the processor 222 may control the server 150 to perform operations 610 through 670 included in the keyword search method of FIG. 6. For example, the processor 222 and the constituent elements of the processor 222 may be configured to execute instructions according to a code of a program and a code of an OS included in the memory 221.

Here, the constituent elements of the processor 222 may be representations of different functions performed at the processor 222 in response to an instruction provided from the program code stored on the server 150, for example, an instruction provided from a program executed on the server 150. For example, the message receiver 510 may be used as a functional representation of the processor 222 that controls the server 150 to receive an instant message in response to the instruction.

In operation 610, the processor 222 may read a desired instruction from the memory 221 to which instructions associated with control of the server 150 are loaded. In this case, the read instruction may include an instruction or instructions for controlling the processor 222 to perform operations 620 through 670.

In operation 620, the message receiver 510 may control the server 150 to receive from the electronic device 110 at least a portion of the entire instant messages transmitted and received through a conversion session set between an account of a user of the electronic device 110 and an account of another user. For example, at least a portion of instant messages transmitted in operation 440 of FIG. 4 may be received at the server 150 in operation 620. As described above, the at least a portion of instant messages may be transmitted from the electronic device 110 to the server 150 through the network 170, independently from the conversation session.

In operation 630, the keyword extractor 520 may extract a keyword from the received at least a portion of the entire instant messages. For example, keywords may be extracted by performing a morphemic analysis on texts included in the received instant messages. All of the extracted keywords may be used for search. If desired, a portion of the extracted keywords may be selectively used for search. In some example embodiments, search may be conducted in association with only a single meaning selected from among a plurality of meanings associated with a single keyword. To this end, at least one of operations 640 and 650 may be selectively performed. Further, the extracted keywords may be merged and used as a single keyword or query. For example, a keyword "tomorrow" and a keyword "weather" may be merged or combined, and may be used as a single keyword or query, (e.g., "tomorrow weather"). Individual keywords may be constructed as a single keyword, or may be constructed as a combination of a plurality of words. For example, "interesting movie" may be extracted as a single keyword from an instant message "is there any interesting movie?".

In operation 640, if a plurality of keywords is extracted from the at least a portion of instant messages, the keyword selector 530 may select a desired (or alternatively, preset) number of keywords based on a query count associated with each of the extracted plurality of keywords. For example, the server 150 may include a system that provides a search result using a search engine. Here, a query count (QC) database may be constructed in advance in the server with respect to a keyword-by-keyword query count based on the existing input keywords. In this case, the keyword selector 530 may acquire a query count of each of keywords extracted from the query count database, and may select a desired (or alternatively, predetermined) number of, for example, three or four, keywords based on the query count. An example of selecting a keyword will be further described below. If a separate keyword is not selected (e.g., if all of the extracted keywords are used), operation 640 may be omitted.

If an extracted keyword has at least two meanings, the meaning matcher 540 may select a single meaning from among the at least two meanings and may match the selected meaning to the extracted keyword in operation 650. A single keyword may be a multi-meaning word having at least two meanings. For example, a keyword "one piece" may include a meaning indicating a type of clothing and a meaning indicating a title of a cartoon. In this case, the meaning matcher 540 may match a single meaning, for example, the meaning indicating the type of clothing, between the two meanings to the extracted keyword "one piece". An example of matching which meaning among at least two meanings to a keyword will be further described.

In operation 660, the search result generator 550 may generate a search result using the extracted keyword. If a desired (or alternatively, preset) number of keywords are selected from among the extracted keywords in operation 640, the search result generator 550 may generate a search result using the selected keywords. Further, if a single meaning is matched to the extracted keyword in operation 650, the search result generator 650 may generate a search result corresponding to the matched meaning. As described above, the server 150 may generate a search result associated with a keyword selected by the user from among the extracted keywords.

In operation 670, the search result transmitter 560 may control the server 150 to transmit the generated search result to the electronic device 110. The search result transmitted in operation 670 may be received at the electronic device 110 in operation 450 of FIG. 4, and the received search result may be displayed on the electronic device 110. The user of the electronic device 110 may receive search result(s) associated with instant messages transmitted and received through a conversation session currently in use, instead of receiving a search result associated with a keyword input from the user.

According to an example embodiment, the message transmitter 330 may transmit to the server 150 an instant message displayed on the screen through the messenger interface at a point in time at which the search instruction is input among the entire instant messages in operation 440. For example, instant messages currently being displayed on the screen of the electronic device 110 may be transmitted to the server 150. In this case, the user of the electronic device 110 may receive a search result associated with the instant message being displayed on the screen of the electronic device 110 from the server 150.

Figure 7:
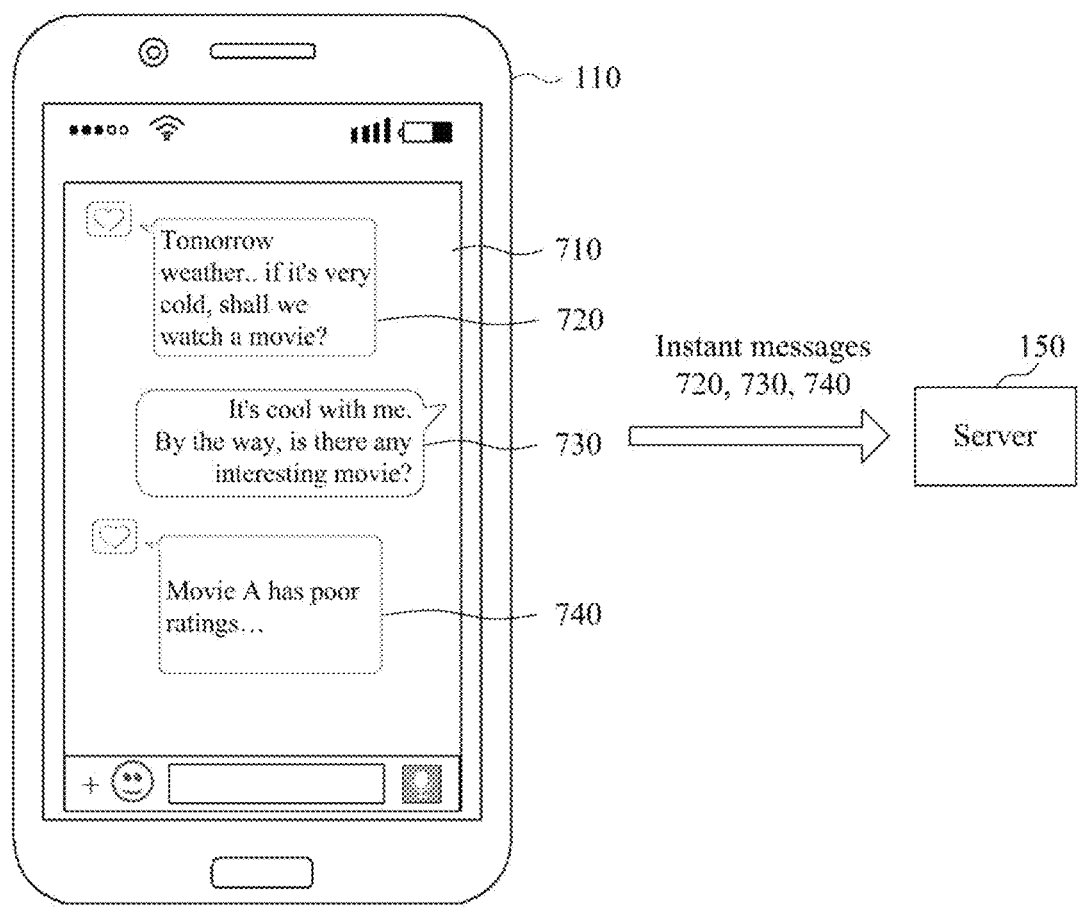
FIG. 7 illustrates an example of transmitting, to a server, an instant message currently displayed on a screen of an electronic device according to an example embodiment.
Figure 8:
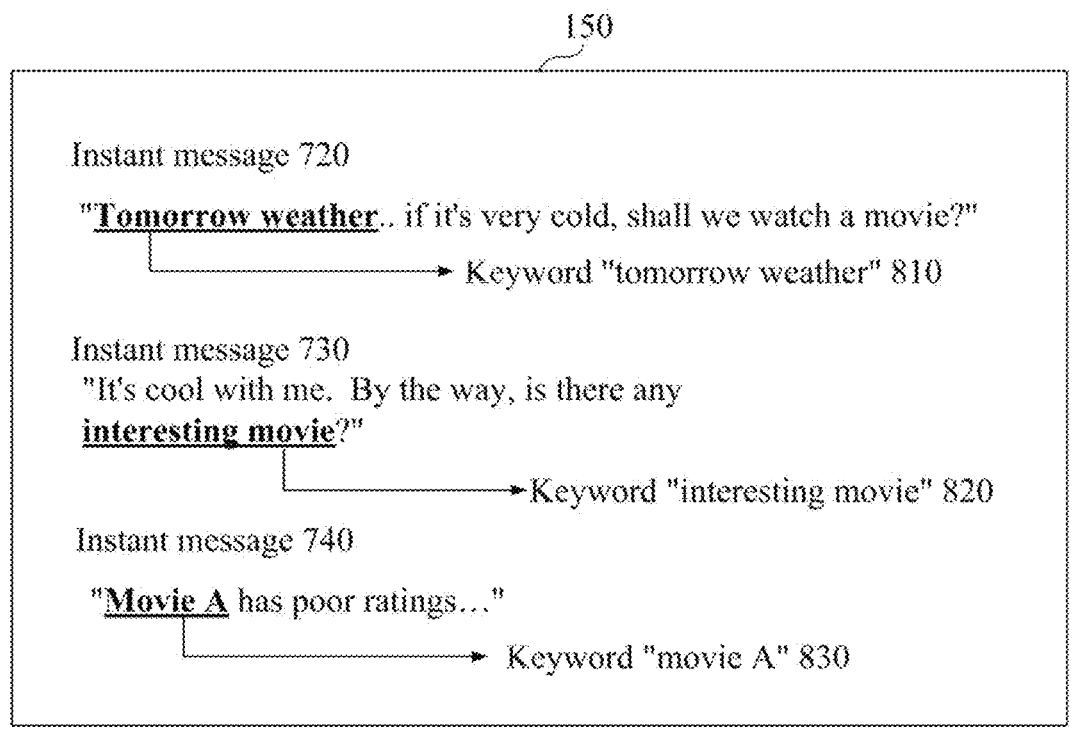
FIG. 8 illustrates an example of a server extracting a keyword from an instant message according to an example embodiment.
Figure 9:
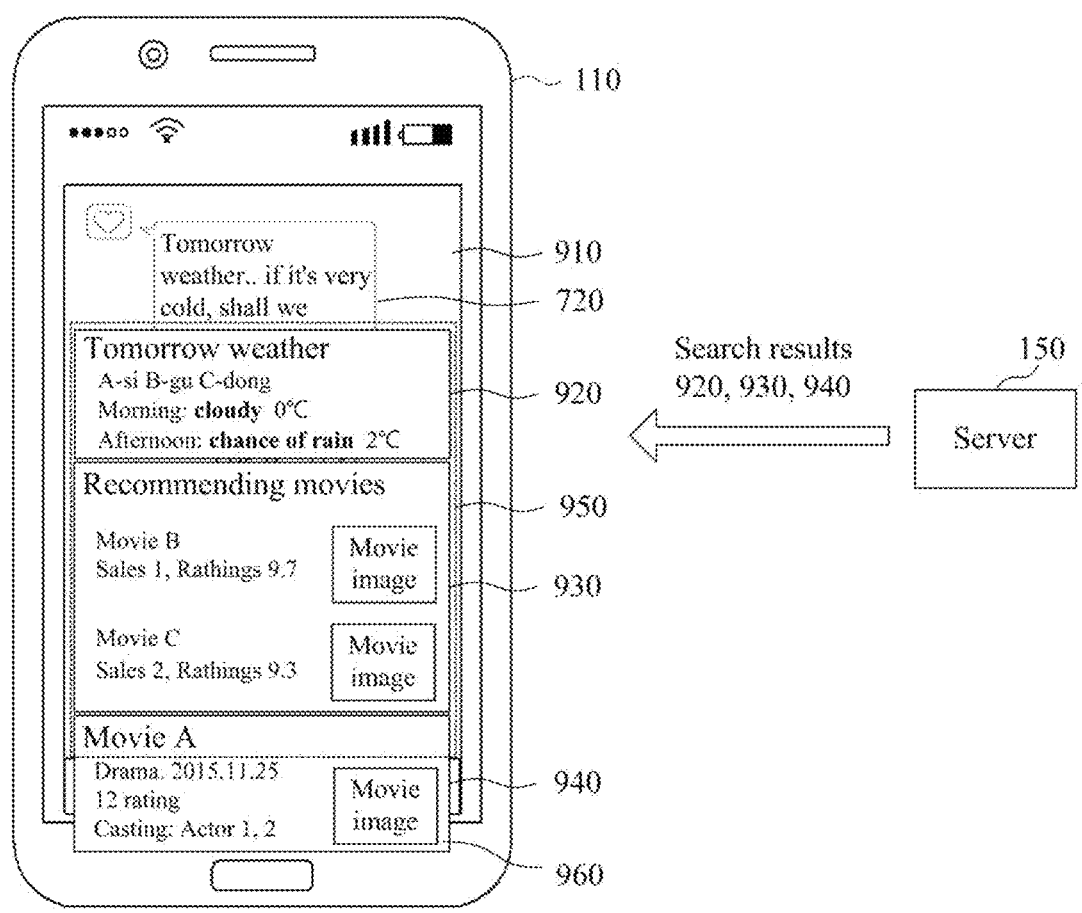
FIG. 9 illustrates an example of displaying a search result provided from a server on a screen of an electronic device according to an example embodiment.

FIG. 7 illustrates an example of transmitting an instant message currently displayed on a screen of an electronic device to a server according to an example embodiment. FIG. 8 illustrates an example of a server extracting a keyword from an instant message according to an example embodiment. FIG. 9 illustrates an example of displaying a search result provided from a server on a screen of an electronic device according to an example embodiment.

FIG. 7 illustrates an example of instant messages 720, 730, and 740 displayed on a screen 710 of the electronic device 110, and also illustrates an example of transmitting the instant messages 720, 730, and 740 displayed on the screen 710 of the electronic device 110 to the server 150. For example, as described above, the electronic device 110 may store and manage messages transmitted and received through a conversation session. Also, the electronic device 110 may render and display contents of the instant messages 720, 730, and 740 currently being displayed on the screen 710, and may verify messages being displayed. The electronic device 110 may transmit the verified instant messages 720, 730, and 740 to the server 150 over the network 170.

FIG. 8 illustrates an example of extracting keywords 810, 820, and 830 from the instant messages 720, 730, and 740 received at the server 150, respectively. As described above, the server 150 may generate a search result associated with each of the extracted keywords 810, 820, and 830, and may select a desired (or alternatively, preset) number of keywords from among the extracted keywords 810, 820, and 830 and may generate search result(s) associated with the selected keyword(s). Further, the server 150 may select a specific meaning from a multi-meaning word and matching the selected specific meaning to a corresponding keyword. Further, the server 150 may provide a service so that the user may select a single keyword from among the extracted keywords 810, 820, and 830. For example, the server 150 may transmit a list of the extracted keywords 810, 820, and 830 to the electronic device 110. The electronic device 110 may provide a function of receiving a user selection on at least one keyword from among the extracted keywords 810, 820, and 830, and may notify the server 150 of the selected keyword, for example, the keyword 810.

Once a keyword for search is selected, the server 150 may proceed with search using the selected keyword, generate a search result, and transmit the generated search result to the electronic device 110.

FIG. 9 illustrates an example of displaying search results 920, 930, and 940 generated at the server 150 on a screen 910 of the electronic device 110. The search result 920 may represent a search result associated the keyword 810 "tomorrow weather", the search result 930 may represent a search result associated with the keyword 820 "interesting movie", and the search result 940 may represent a search result associated with the keyword 830 "movie A". As described above, the users may receive the search results 920, 930, and 940 associated with the instant messages 720, 730, and 740 displayed on the screen 710 of FIG. 7, respectively.

According to an example embodiment, instead of providing a search result to the electronic device 110 through a separate search screen, the search result may be provided in association with a messenger interface, for example, a chatroom displayed on the screen 710 of FIG. 7, on which an instant message is displayed. For example, FIG. 9 illustrates an example of displaying the search results 920, 930, and 940 in a form of a pop-up card on a desired (or alternatively, preset) area of a messenger interface. Here, a box 950 indicated with dotted lines represents an area of a screen on which the search results 920, 930, and 940 are displayed. For example, a portion 960 (e.g., a portion positioned outside the box 950) of the search result 940 may not be displayed on the screen 910. In some example embodiments, in response to an event (e.g., a touch-and-drag event or a swipe event of the user), a portion of the search results 920, 930, and 940 to be displayed on the box 950 may be changed. For example, the electronic device 110 may recognize an event in which the user swipes an area of the box 950 upward, and in response thereto, move upward and thereby display the search results 920, 930, and 940. Thus, the search results 920, 930, and 940 may be moved so that the entire search result 940 is displayed on the screen 910.

Figure 10:
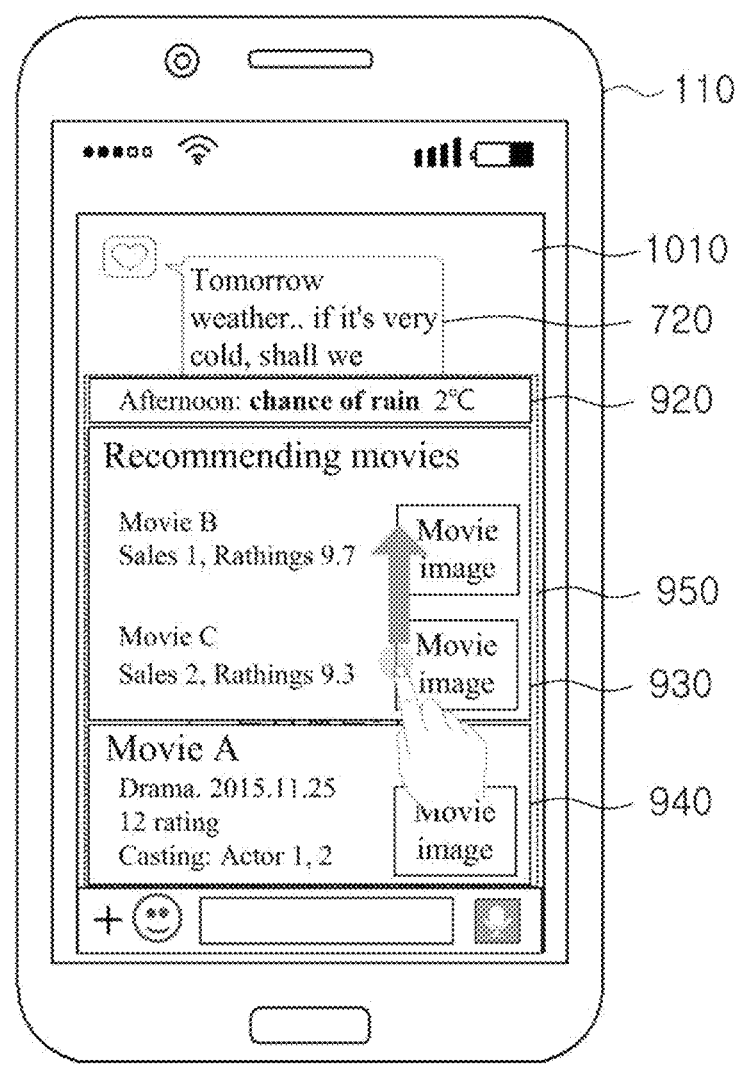
FIG. 10 illustrates an example of moving a search result displayed on a screen of an electronic device according to an example embodiment.

FIG. 10 illustrates an example of moving a search result displayed on a screen of an electronic device according to an example embodiment. A screen 1010 of FIG. 10 shows an example of moving upward and thereby displaying the search results 920, 930, and 940 in response to an upward swipe event of the user on the screen 910 of FIG. 9. Accordingly, the entire search result 940 may be displayed on the screen 1010. Referring to FIG. 10, only a portion of the search result 920 is displayed on the screen 1010.

If the user touches another area of a chatroom aside from the area of the box 950 on the screen 1010, displaying of the search 920, 930, and 940 may be cancelled, and a switch to an original chatroom screen (e.g., the screen 710) of FIG. 7 may be performed.

According to an example embodiment, the electronic device 110 may provide a function of calling a process associated with a search result through a pop-up card in order to display the search result. For example, the search result display 350 may provide a user interface (e.g., a link for a specific function) to the pop-up card when displaying the search result. Here, the process associated with the search result may include at least one of a process of connecting to a site associated with the search result, a process of playing back content associated with the search result, and a process of providing the search result through a conversation session.

Figure 11:
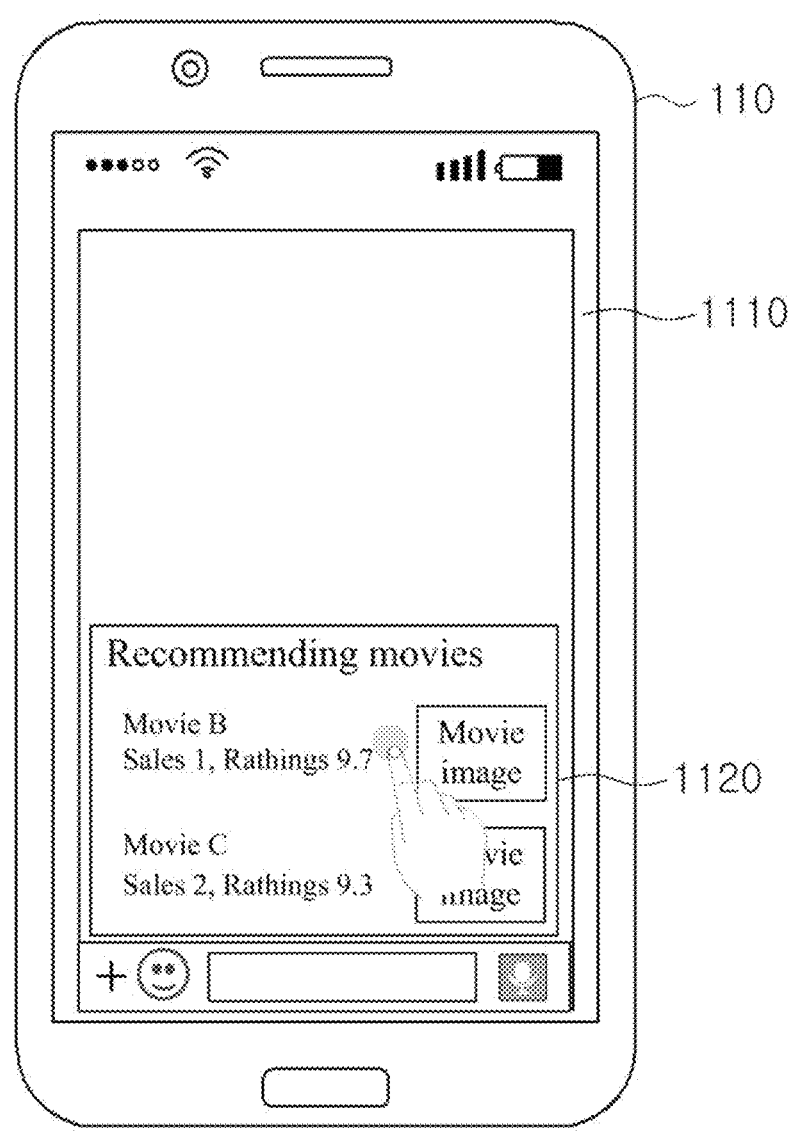
FIGS. 11 and 12 illustrate an example of describing a process of connecting to a site associated with a search result according to an example embodiment.
Figure 12:
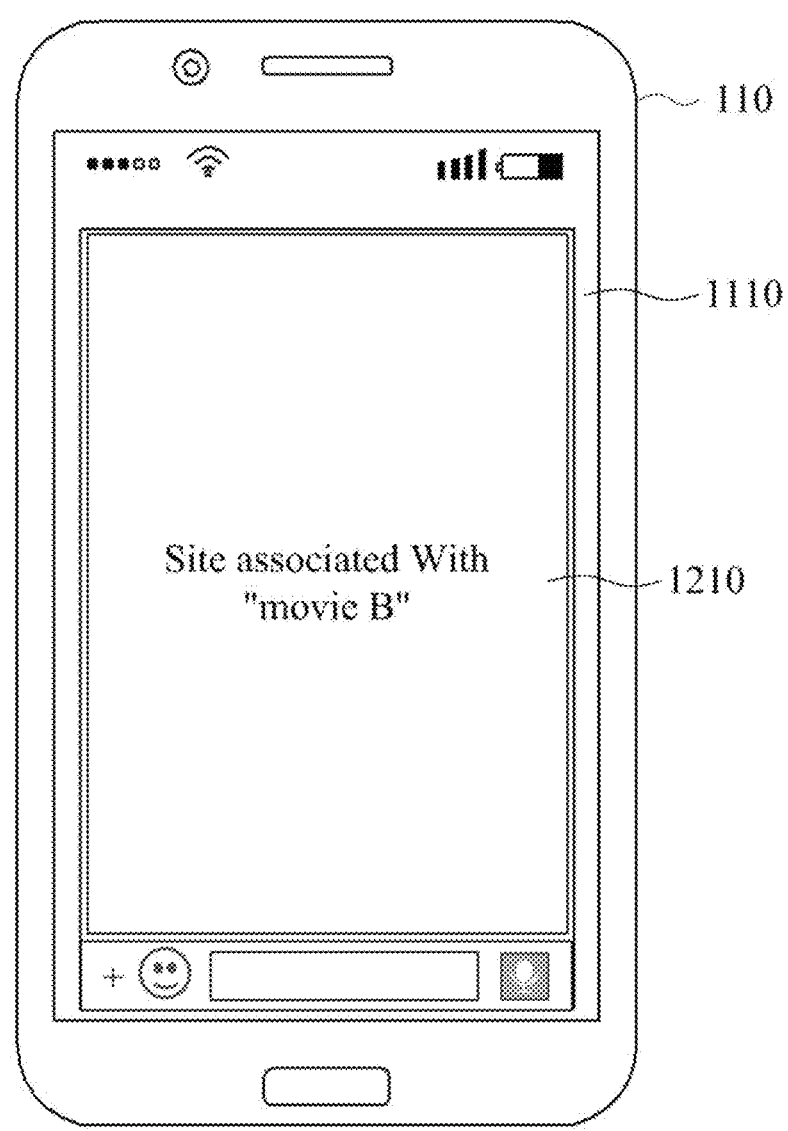

FIGS. 11 and 12 illustrate an example of describing a process of connecting to a site associated with a search result according to an example embodiment. FIG. 11 illustrates an example in which a user touches an area corresponding to "movie B" from a search result 1120 displayed on a screen 1110 of the electronic device 110. FIG. 12 illustrates an example in which a site 1210 associated with "movie B" is displayed on the screen 1110 of the electronic device 110 in response to the touch of FIG. 11. For example, a link to the site 1210 associated with "movie B" may be set to the search result 1120 as a function of calling the aforementioned process. For example, when generating the search result 1120, the server 150 may include an instruction for setting the aforementioned link in the search result 1120. In this case, when displaying the search result 1120 on the screen 1110, the electronic device 110 may set the link to the site 1210 associated with "movie B" on an area corresponding to "movie B". Also, a link to a site associated with "movie C" may be set on an area corresponding to "movie C". The link may be set to an individual image or a text included in the search result 1120. A link to a different site may be set for each individual image or text.

According to the example embodiment, users may be provided with search results primarily through a chatroom and may selectively connect to further detailed information through the individual search results.

Figure 13:
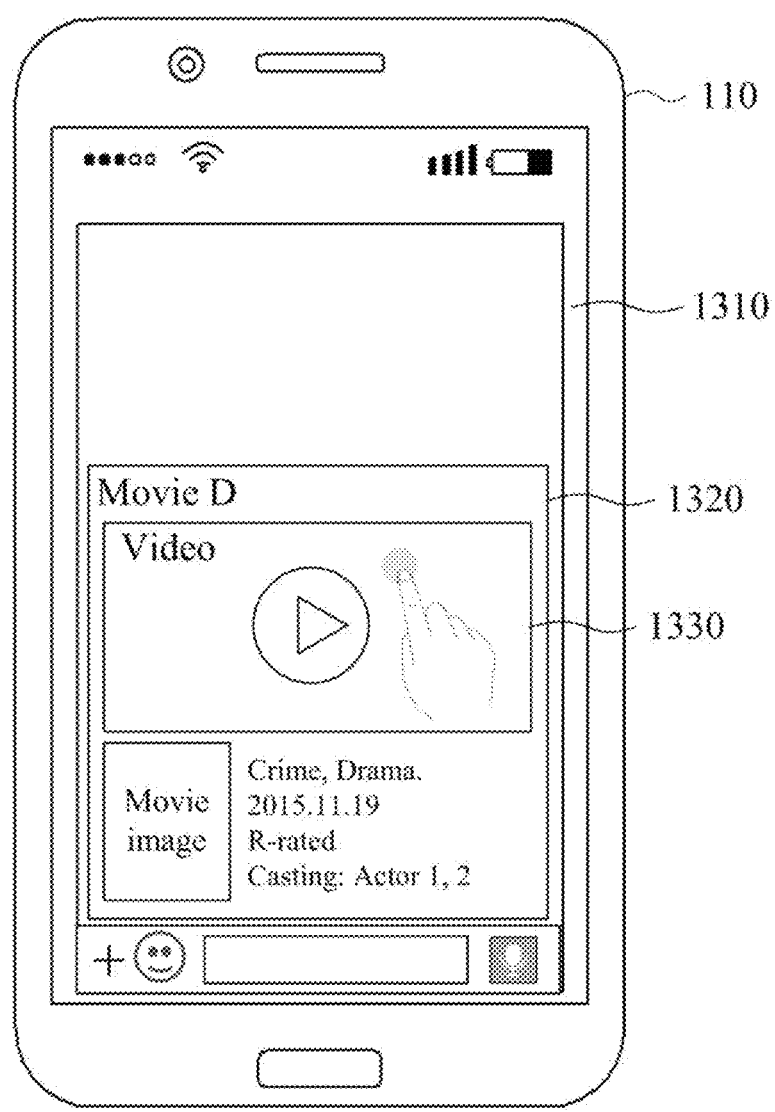
FIG. 13 illustrates an example of a process of playing back content associated with a search result according to an example embodiment.

FIG. 13 illustrates an example of a process of playing back content associated with a search result according to an example embodiment. FIG. 13 illustrates an example in which a search result 1320 displayed on a screen 1310 of the electronic device 110 includes a video 1330. In this case, a pop-up card of the search result 1320 may include a function of playing back the video 1330. In response to a user touch on an area of the video 1330, a video associated with "movie D" may be played back on the area. One or more player functions (e.g., moving a playback location of a video, suspending a playback of the video, or switching to view a full screen) may be provided on the area of the video 1330.

According to another example embodiment, content (e.g., a sound source associated with a search result, a flash game, or a video) may be played back. Function of controlling the content being played back may be further provided.

According to the example embodiment, users may be provided with search results primarily through a chatroom, and may immediately play back content from a primary search result.

Figure 14:
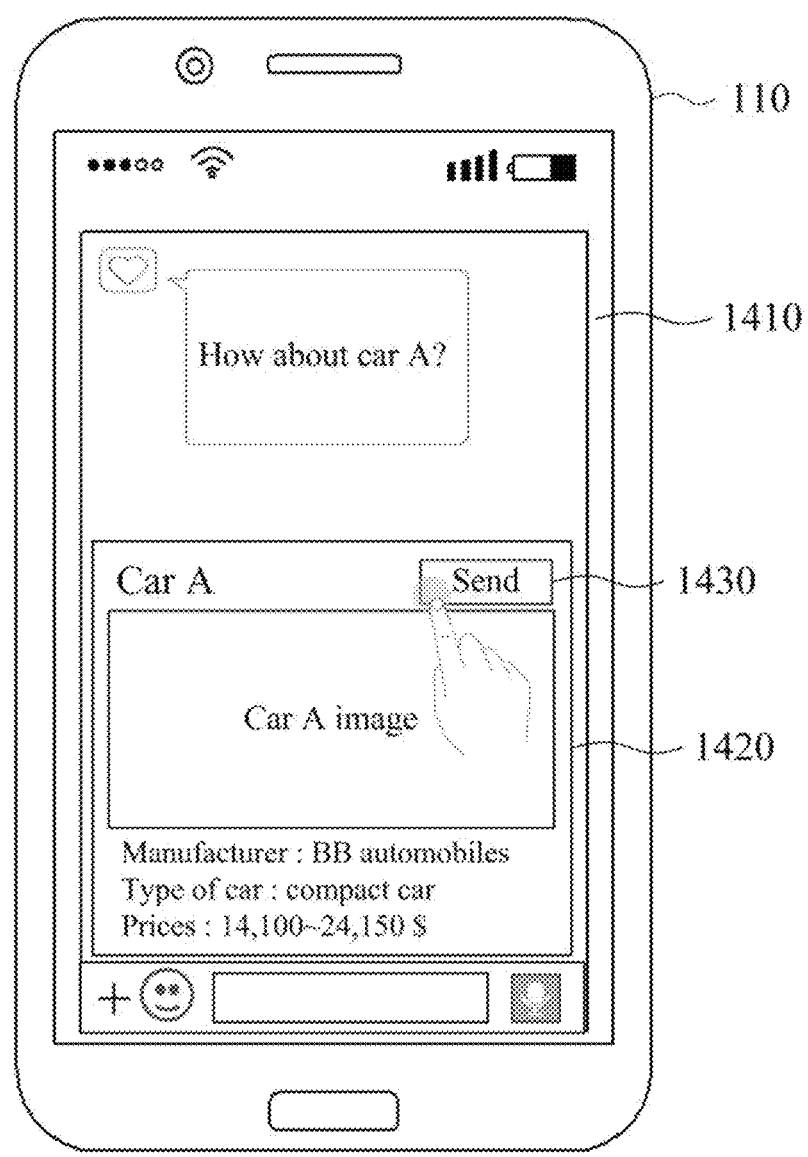
FIGS. 14 and 15 illustrate an example of describing a process of providing a search result through a conversation session according to an example embodiment.
Figure 15:
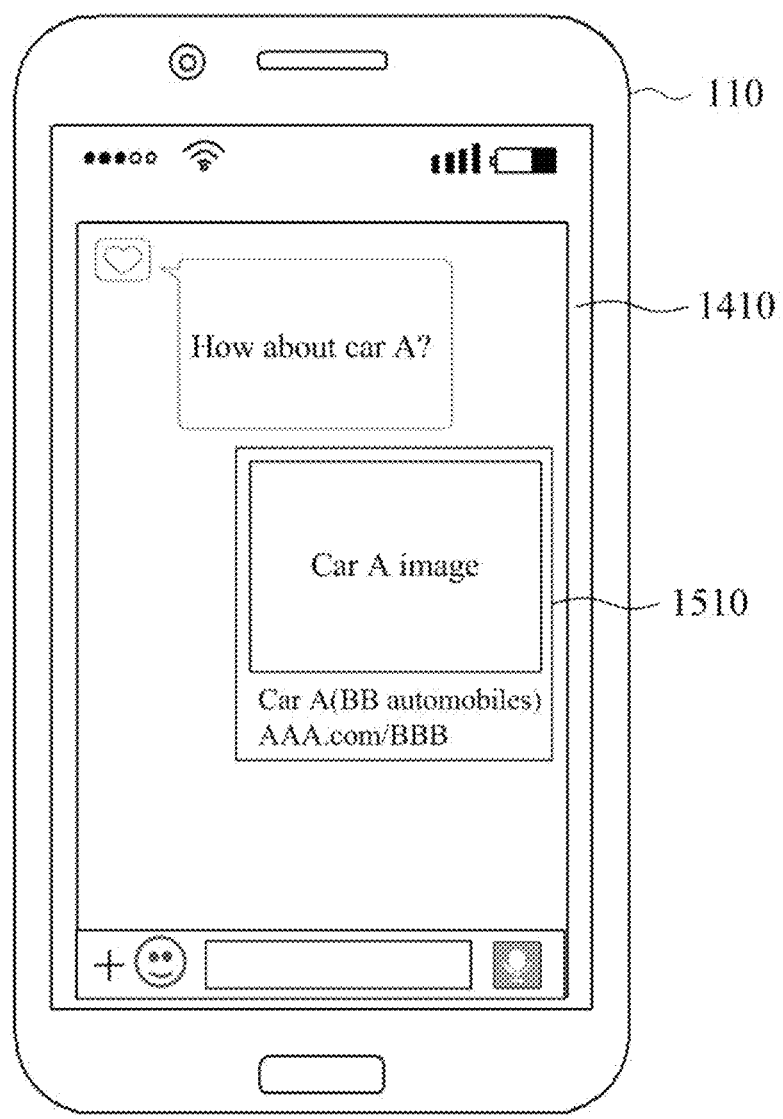

FIGS. 14 and 15 illustrate an example of describing a process of providing a search result through a conversation session according to an example embodiment. FIG. 14 illustrates an example in which a search result 1420 is displayed in a form of a pop-up card on a screen 1410 of the electronic device 110. Here, the search result 1420 may include a user interface (e.g., a send button 1430). The user interface may provide a function of transmitting the search result 1420 through the conversation session. For example, in response to a user touch on the send button 1430, information about the search result 1420 may be transmitted to participants of the conversation session as an instant message, and a messenger server (e.g., the server 160) may route transmission of the instant message. Here, FIG. 15 illustrates an example in which information 1510 about the search result 1420 is displayed on the screen 1410 of the electronic device 110 as an instant message. In this case, a link to a site associated with the search result 1420 may be set to the information 1510. Further, the information 1510 may further include a function of playing back content based on a type of the search result 1420.

According to the example embodiment, users may be provided with search results primarily through a chatroom and may easily share content of a desired search result among the search results with participants of the chatroom.

As described above, a search process using the electronic device 110 may be performed in response to an input of a search instruction. Hereinafter, a search instruction input process will be further described.

According to an example embodiment, the search instruction receiver 320 may receive a search instruction in response to a user selection on a desired (or alternatively, preset) area of the messenger interface in operation 430 of FIG. 4, (e.g., in response to a user touch on a desired (or alternatively, preset) area using a finger in a touch screen environment). For example, a search instruction may be generated in response to an explicit user selection on a search button or a specific area of a chatroom.

Figure 16:
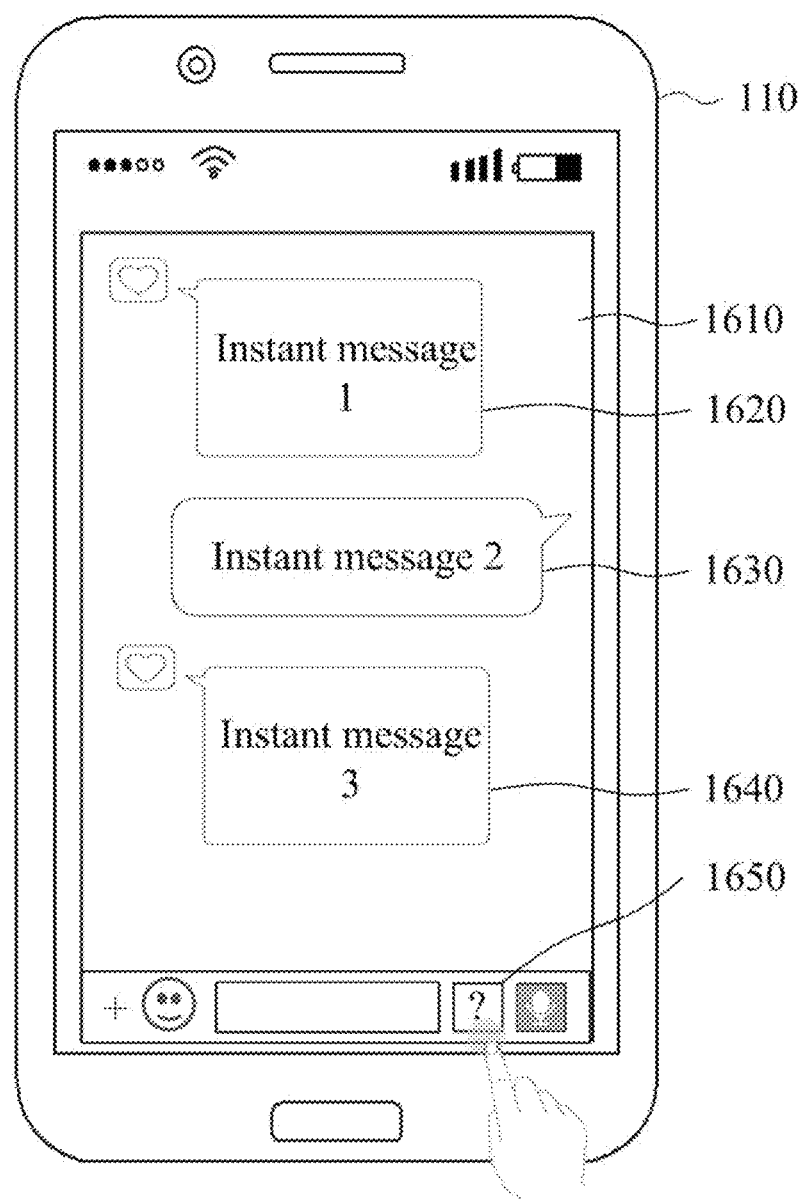
FIG. 16 illustrates an example of a search button according to an example embodiment.

FIG. 16 illustrates an example of a search button according to an example embodiment. FIG. 16 illustrates an example in which instant messages 1620, 1630, and 1640 are displayed on a screen 1610 of the electronic device 110. Here, a user interface (e.g., a separate search button 1650) for triggering a search may be displayed on the screen 1610. In response to a user touch on the search button 1650, the search instruction may be generated at the electronic device 110 and the search instruction receiver 320 may receive the generated search instruction. The following search process using the instant messages 1620, 1630, and 1640 may be performed as described above with the example embodiments.

Figure 17:
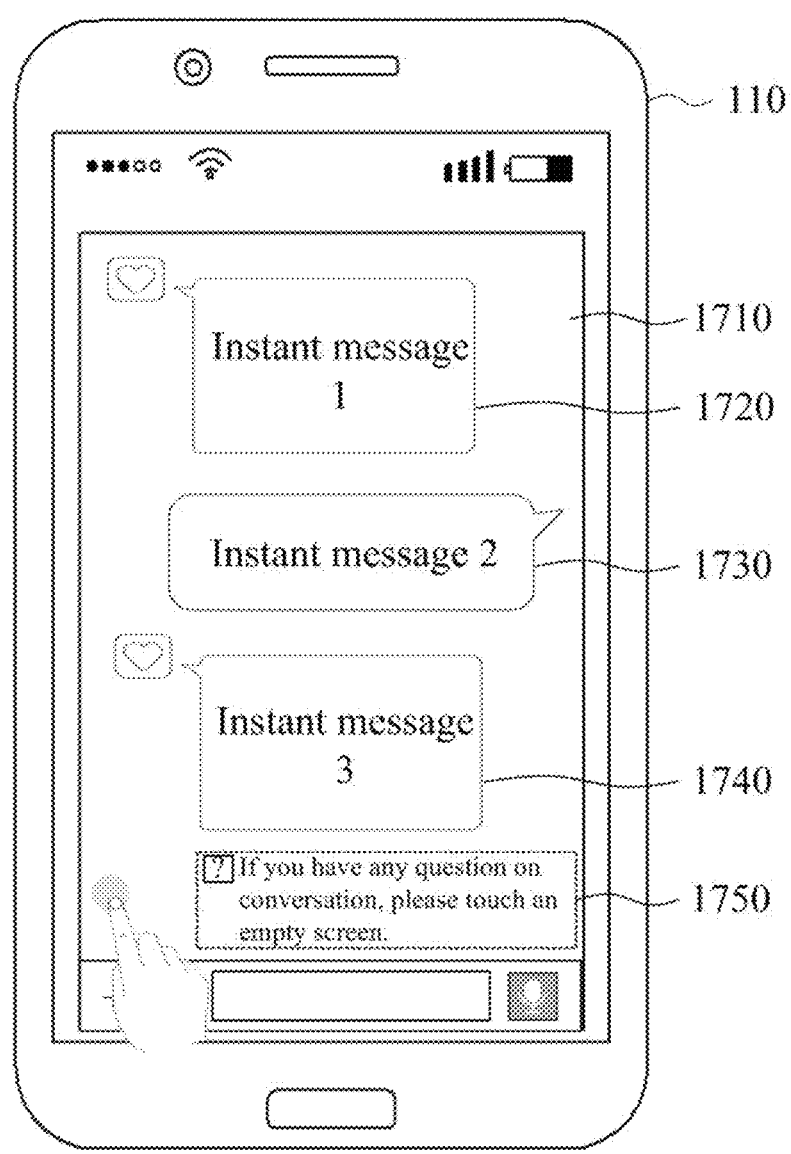
FIG. 17 illustrates an example of selecting a wallpaper of a chatroom according to an example embodiment.

FIG. 17 illustrates an example of selecting a wallpaper of a chatroom according to an example embodiment. FIG. 17 illustrates an example in which instant messages 1720, 1730, and 1740 are displayed on a screen 1710 of the electronic device 110. Further, as shown in a box 1750 indicated with dotted lines, a guide text indicating that a user is capable of triggering a search by touching an empty area of the screen 1710 may be displayed on the screen 1710. In response to a user touch on the empty area (e.g., an area excluding an area on which the instant messages 1720, 1730, and 1740 are displayed on a chatroom area) on the screen 1710, a search instruction may be generated at the electronic device 110 and the search instruction receiver 320 may receive the generated search instruction. A search process using the instant messages 1720, 1730, and 1740 may be performed as described above with the example embodiments.

According to another example embodiment, the search instruction receiver 320 may receive a search instruction that is generated based on an output value of a sensor included in the electronic device 110 in operation 430 of FIG. 4.

Figure 18:
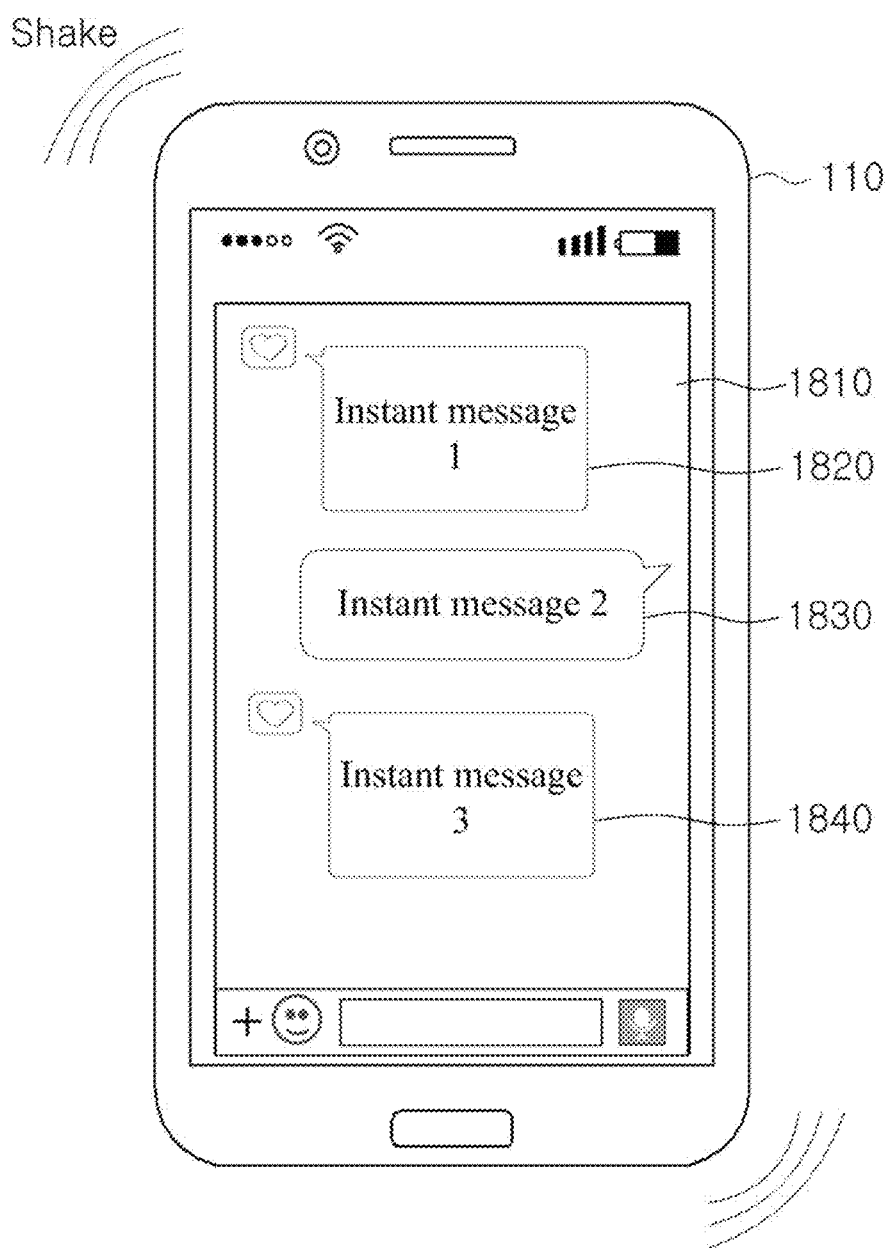
FIG. 18 illustrates an example of inputting a search instruction using a sensor of an electronic device according to an example embodiment.

FIG. 18 illustrates an example of receiving a search instruction using a sensor of an electronic device according to an example embodiment. FIG. 18 illustrates an example in which instant messages 1820, 1830, and 1840 are displayed on a screen 1810 of the electronic device 110. Here, if the user shakes the electronic device 110, a sensor (e.g., an accelerometer sensor, a gyroscope sensor, or an electromagnetic sensor) included in the electronic device 110 may provide an output value in response to a movement of the electronic device 110. Here, as a desired (or alternatively, preset) output value, output from the sensor of the electronic device 110, is input in response to the user shaking the electronic device 110, the search instruction receiver 320 may receive a search instruction. Further, output values of various sensors (e.g., an optical sensor, a gravity sensor, or a proximity sensor) may be used.

In some example embodiments, the search instruction receiver 320 may compare an output value range of a specific sensor stored or pre-stored in the electronic device 110 with an output value of the specific sensor of the electronic device 110, and if the output value is included in the output value range, the search instruction receiver 320 may regard that the search instruction is input. In some example embodiments, a plurality of output value ranges associated with a plurality of sensors may be used. For example, an output value range of an accelerometer sensor or an output value range of a gyroscope sensor may be stored or pre-stored in the electronic device 110. If an output value of the accelerometer sensor is included in the stored or pre-stored output value range of the accelerometer sensor and at the same time, an output value of the gyroscope sensor is included in the stored or pre-stored output value of the gyroscope sensor, the search instruction receiver 320 may regard that the search instruction is input. The output value range may be stored or pre-stored in the electronic device 110, and if desired, may be downloaded from the server 150 or the server 160 (e.g., a messenger server) for conducting a keyword search over the network 170. A sensor for inputting a search instruction may be determined based on a type of the electronic device 110 accommodating the sensor. The output value range may be preset or determined to be different based on, for example, the type of the sensor or the type of the electronic device 110.

Figure 19:
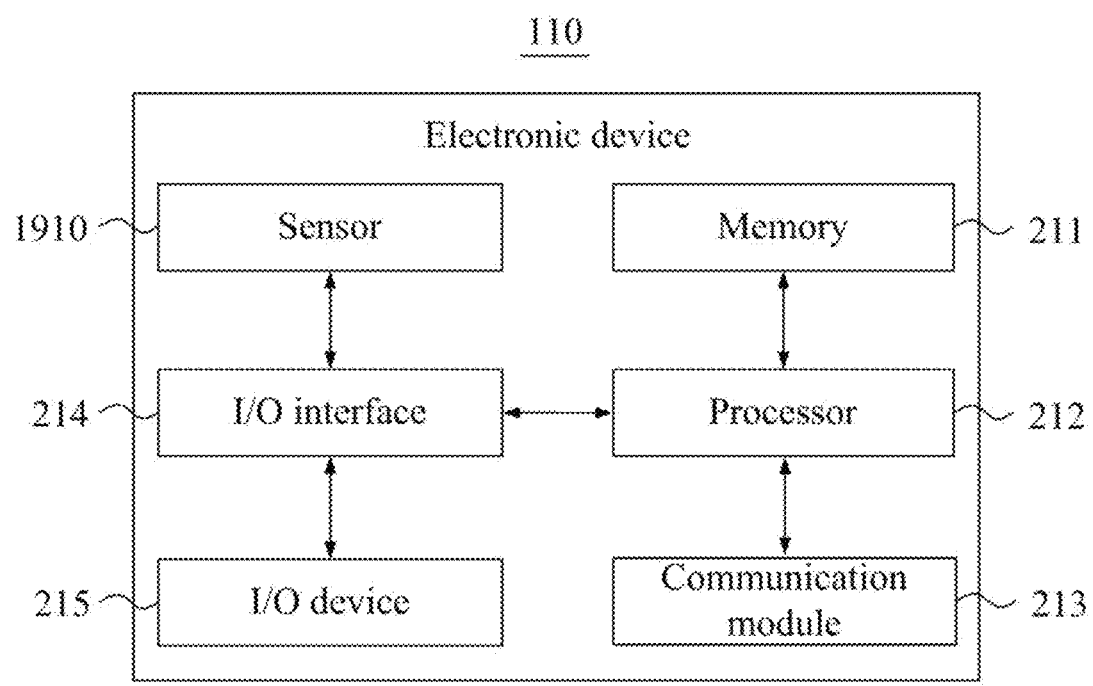
FIG. 19 illustrates another example of a configuration of an electronic device according to an example embodiment.

FIG. 19 illustrates another example of a configuration of an electronic device according to an example embodiment. Referring to FIG. 19, the electronic device 110 may include the memory 211, the processor 212, the communication module 213, and the I/O interface 214 as constituent elements, and may further include the I/O device 215 (e.g., a touch screen or a physical button) and a sensor 1910. As described above, the sensor 1910 may include at least one of various sensors (e.g., an accelerometer sensor, a gyroscope sensor, a gravity sensor, a proximity sensor, or an optical sensor). Further, an output value provided from the sensor 1910 in a state in which an instant message is displayed on a screen of the electronic device 110 through a messenger interface may trigger a generation or an input of a search instruction.

Figure 20:
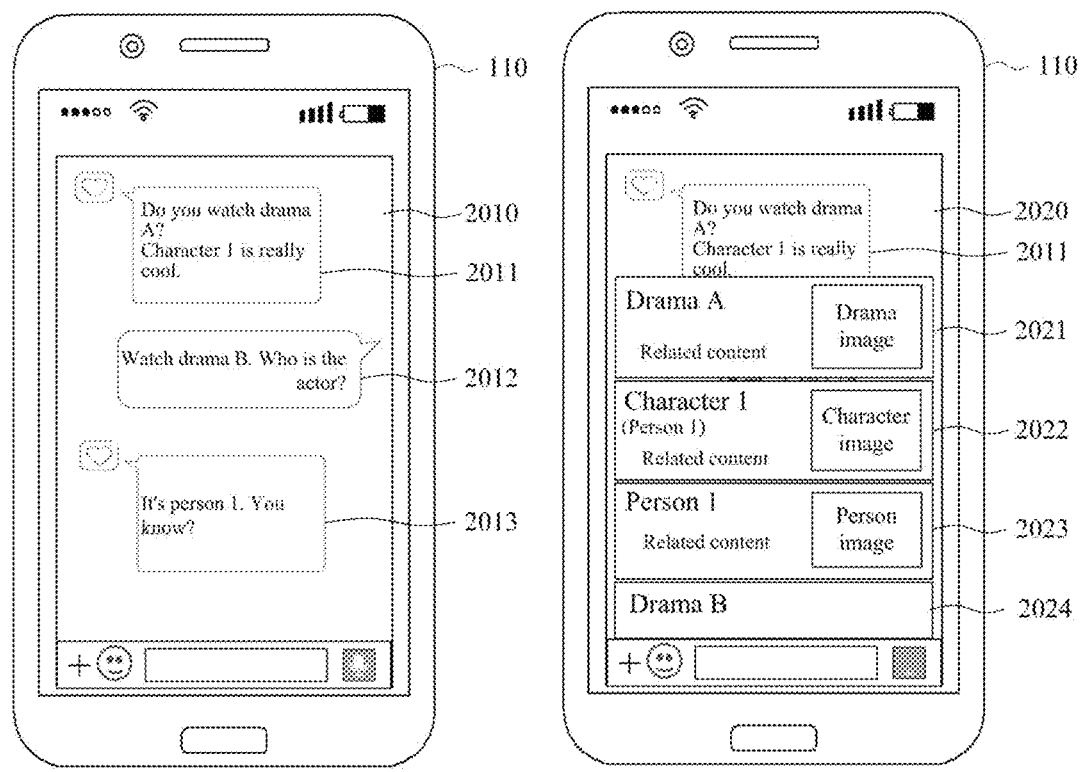
FIG. 20 illustrates an example of providing a search result using an instant message according to an example embodiment.

FIG. 20 illustrates an example of providing a search result using an instant message according to an example embodiment.

Referring to FIG. 20, instant messages 2011, 2012, and 2013 may be displayed on a first screen 2010 of the electronic device 110, and search results 2021, 2022, 2023, and 2024 corresponding to the instant messages 2011, 2012, and 2013 may be displayed on a second screen 2020 of the electronic device 110. For example, the electronic device 110 may transmit the instant messages 2011, 2012, and 2013 displayed on the first screen 2010 to the server 150 in response to a search instruction. Here, the server 150 may extract keywords from the transmitted instant messages 2011, 2012, and 2013, and generate the search results 2021, 2022, 2023, and 2024 using the extracted keywords. The server 150 may transmit the generated search results 2021, 2022, 2023, and 2024 to the electronic device 110, and the electronic device 110 may display the received search results 2021, 2022, 2023, and 2024 in association with a corresponding chatroom.

In the example embodiment, the electronic device 110 may further transmit to the server 150 user classification information for classifying an instant message for each user that participates a conversation session. For example, when transmitting an instant message to the server 150 in operation 440 of FIG. 4, the message transmitter 330 may control the electronic device 110 to further transmit the user classification information to the server 150. Here, the user classification information may include account information of a user that matches the instant message, in order to identify a specific user having transmitted the instant message. For example, if an account of a first user of the electronic device 110 is "AAA" and an account of a second user of the electronic device 120 participating a conversation session is "BBB", the user classification information may include information in which an instant message of the second user and the account "BBB" of the second user are matched to each other. However, for privacies of users, the user classification information may include information for classifying users in an anonym form. For example, if the account of the first user is "AAA", the account of the second user is "BBB", and an account of a third user is "CCC", users may be classified in an anonym form (e.g., the first user as "person concerned", the second user as "user A", and the third user as "user B"). In this case, an instant message of the first user may be classified into an instant message of "person concerned", an instant message of the second user may be classified into an instant message of "user A", and an instant message of the third user may be classified into an instant message of "user B". Here, "person concerned", "user A", and "user B" give in the anonym forms may be information incapable of specifying a user.

Here, the server 150 may assign a relatively high search priority to an instant message of a specific user based on the user classification information. For example, in the example of FIG. 20, in response to the first user of the electronic device 110 requesting the server 150 for a search, a relatively high search priority may be assigned to the instant messages 2011 and 2013 of the second user compared to the instant message 2012 of the first user. In this case, a relatively high search priority may be assigned to the search results 2021, 2022, and 2023 associated with keywords, "drama A", "character 1", and "person 1", extracted from the instant messages 2011 and 2013 of the second user. A relatively low search priority may be assigned to the search result 2024 associated with a keyword "drama B" extracted from the instant message 2012 of the first user. Accordingly, the search results 2021, 2022, and 2023 having the relatively high search priority may be disposed at an upper end of the second screen 2020 compared to the search result 2024 having the relatively low search priority.

An example of selecting a keyword based on a query count for each keyword is described. Similarly, display rankings of search results corresponding to the same priority may be determined based on the query count. For example, if the keyword "drama A" has the largest query count among the keywords "drama A", "character 1", and "person 1", the search result 2021 associated with the keyword "drama A" may be determined to have a highest display ranking.

Figure 21:
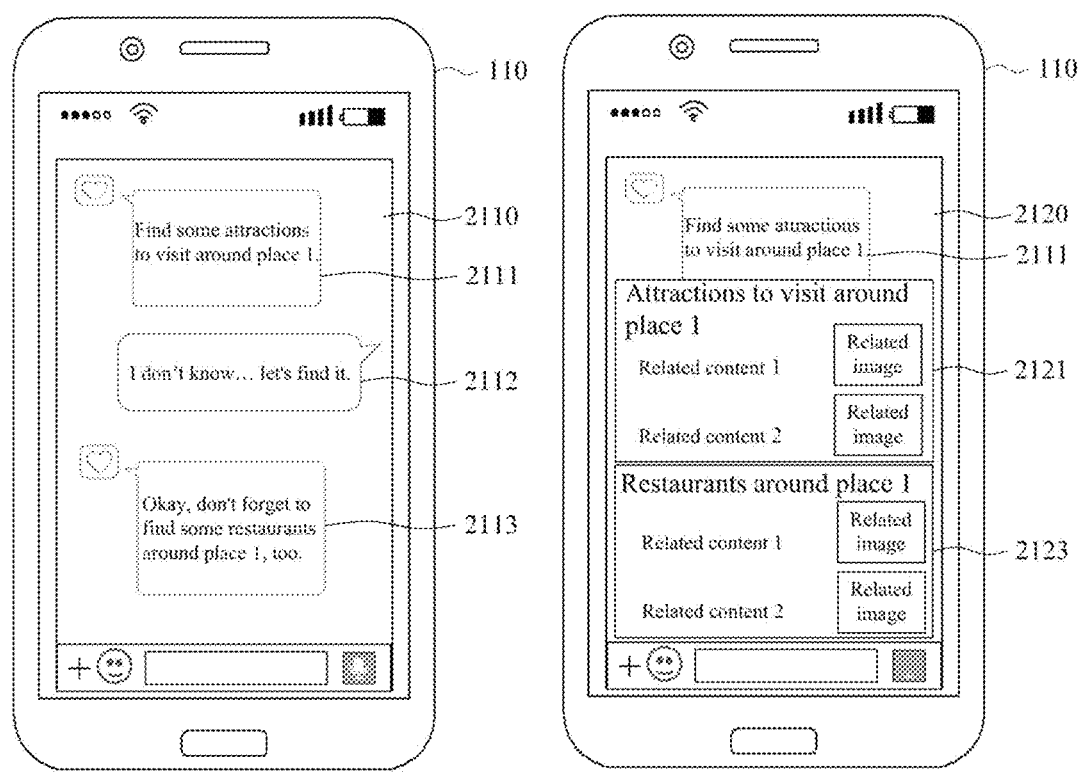
FIG. 21 illustrates another example of providing a search result using an instant message according to an example embodiment.

FIG. 21 illustrates another example of providing a search result using an instant message according to an example embodiment.

Referring to FIG. 21, instant messages 2111, 2112, and 2113 are displayed on a third screen 2110 of the electronic device 110 and search results 2121 and 2123 corresponding to the instant messages 2111, 2112, and 2113 are displayed on a fourth screen 2120 of the electronic device 110. Here, each of the search results 2121 and 2123 corresponds to an example in which at least two search results are included in a single pop-up card. For example, if a plurality of search results is associated with "attractions to visit around place 1" used as a keyword, a desired (or alternatively, preset) number of search results among the plurality of search results may be provided through a single pop-up card so that the desired (or alternatively, preset) number of search results may constitute a single search result associated with the keyword "attractions to visit around place 1". For example, the desired (or alternatively, preset) number of search results among the plurality of search results associated with a single keyword may be provided to users as a single group.

Similarly, if search results associated with each of different meanings (e.g., a homonym or a multi-meaning word) are included, search results associated with a keyword common to the different meanings may be provided in a form of a single group with respect to a single keyword. In this case, a search result associated with the keyword "one piece" may be provided as a single search result, for example, a single pop-up card, in which a search result associated with a type of clothing and a search result associated with carton "one piece" are combined into a single group.

An example of transmitting, to the server 150, all of the instant messages 720, 730, and 740 displayed on the screen 710 is described above with reference to FIG. 7. For example, the entire instant messages transmitted and received through a corresponding conversation session may be transmitted to the server 150 and used for a search. At least one instant message selected by the user may be transmitted to the server 150 and used for a search.

Figure 22:
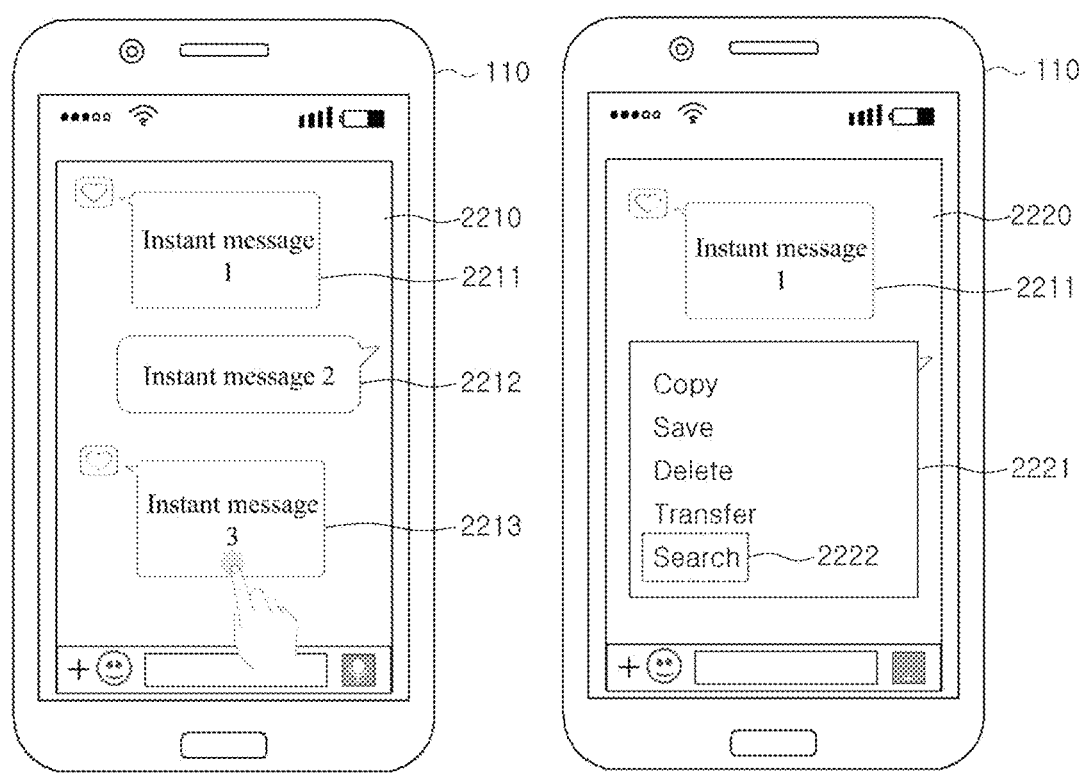
FIG. 22 illustrates an example of transmitting an instant message selected by a user to a server according to an example embodiment.

FIG. 22 illustrates an example of transmitting an instant message selected by a user to a server according to an example embodiment. Referring to FIG. 22, instant messages 2211, 2212, and 2213 are displayed on a first screen 2210 of the electronic device 110 and a specific instant message, for example, the instant message 2213, may be selected by the user. A second screen 2220 shows an example in which a user interface 2221 associated with the instant message 2213 is displayed in response to a desired or preset user input (e.g., a user touch or long-tap, or 3D touch) on an area on which the instant message 2213 is displayed. The user interface 2221 may provide various functions (e.g., copy, save, delete, and/or transfer) in association with the instant message 2213. For example, as shown in a box 2222 indicated with dotted lines, the user interface 2221 may further provide a search function using the instant message 2213. In response to a user selection on the search function, an instant message, for example, the instant message 2213, selected by the user, or an identifier of the instant message may be transmitted to the server 150. A search associated with the corresponding instant message may be processed at the server 150.

According to an example embodiment, when providing search results associated with extracted keywords, the server 150 may select an associated query (e.g., a related keyword) associated with the extracted keywords or selected keywords, generate search results associated with the related keyword, and transmit the further generated search results to the electronic device 110. A method of selecting an associated query (e.g., a related keyword) associated with the extracted keywords may use at least one of known methods. For example, Korean Patent Registration No. 10-0910515 discloses a method and system for determining an associated query.

According to another example embodiment, if an extracted keyword has at least two meanings as described with operation 650 of FIG. 6, the server 150 may select a single meaning from among the at least two meanings and may match the selected meaning to the extracted keyword. It may be used to disambiguate a keyword. For example, if a name of a person is input as a keyword, a plurality of persons with the same name may be present with respect to the input keyword. In this case, the server 150 may match a meaning associated with a single person selected from among the plurality of persons to an extracted keyword, and may provide a search result associated with the selected person among search results associated with the plurality of persons with the same name. Selecting a single meaning from among at least two meanings may be based on context of an instant message or a semantic tagging. For example, in association with a keyword extracted from a single instant message, the server 150 may select a meaning of the keyword by further using a keyword extracted from a previous instant message or a subsequent instant message of the single instant message. For example, if keywords "weather in area AA" and "tomorrow weather" are extracted from instant message 1 and instant message 2 that are continuous instant messages, respectively, a new keyword "tomorrow weather in area AA" may be generated by matching a meaning "tomorrow" to the keyword "weather in area AA". Similarly, if three persons have the same name 1, the server 150 may disambiguate a person 1 of the name 1 by further using keywords of other instant messages. For example, if a person of the name 1 of a person is extracted from another instant message, the server 150 may retrieve a search result that includes all of the person 1 and the person 2, and may retrieve a person associated with the search result from among the three persons with the same name 1 based on content of the retrieved search result. In this manner, the server 150 may match, for example, the person 1 of the name 1 to a keyword. At least one of known methods may be used to process a semantic tagging for a semantic search or a disambiguation. For example, Korean Patent Registration No. 10-0397639 discloses a lexical sense tagging device for word sense disambiguation and a method thereof.

According to another example embodiment, the electronic device 110 may analyze contents of instant messages, may determine a function desired by users, and may provide a site for the function to the users or may automatically execute an application for the function. For example, if an instant message "let's watch a movie" is present and a search instruction is input, the electronic device 110 may provide a search result associated with a keyword "movie" to the users. Here, in addition to the search result, the electronic device 110 may automatically execute a function for movie booking or a booking site using "let's watch" indicating a behavior of the keyword. For example, a desired or preset word (e.g., "let's-" or "please try-") may be used as a trigger to execute a function associated with a keyword.

According to another example embodiment, the electronic device 110 may directly extract a keyword from an instant message, and transmit the extracted keyword to the server 150. In this case, extracted keywords may be transmitted to the server 150, be classifiable for each user of a corresponding instant message based on user classification information, and be transmitted to the server 150 without being separately classified due to privacy issues. For example, in operation 440 of FIG. 4, the message transmitter 330 may control the electronic device 110 to extract at least one keyword from at least a portion of the entire instant messages transmitted and received through a conversation session in response to an input search instruction, and transmit the extracted keyword to the server 150. Here, the server 150 may receive the keyword from the electronic device 110, and generate a search result using the received keyword.

According to another example embodiment, the electronic device 110 may automatically conduct a search operation in response to meeting a specific condition without a user intervention. For example, the electronic device 110 may conduct a search operation periodically or every time a desired (or alternatively, preset) number of instant messages are transmitted or received. In detail, in response to a search instruction occurring at desired (or alternatively, predetermined) time intervals, the electronic device 110 may transmit instant messages currently displayed on a screen to the server 150, or may extract a keyword from the instant messages currently displayed on the screen and may transmit the extracted keyword to the server 150, thereby conducting the search according to the example embodiments. As another example, in response to a search instruction occurring every time new n instant messages are transmitted or received, the electronic device 110 may extract a keyword from the instant messages currently displayed on the screen and may transmit the extracted keyword to the server 150. The specific condition without the user intervention may be variously set and used as desired. For example, a desired (or alternatively, pre-set) condition may include a condition in which an instant message including a specific word is transmitted and received, or a condition in which a theme of a conversion determined by analyzing instant messages currently displayed on the screen.

As described above, a search may be conducted based on the specific condition without the separate user intervention and the search may be smoothly conducted in association with a current ongoing conversation, thereby providing a search result to the user. In this case, the search result may be displayed in a form of a small window or a small card using the empty space within a chatroom not to interrupt a conversation. The electronic device 110 may recognize an interest of the user on the displayed window or card, for example, recognize a user touch on the displayed window or card, and may display a search result or corresponding content through a larger window or card.

According to some example embodiments, it is possible to provide a search result associated with a specific conversation session at a messaging service, instead of simply providing a search result associated with a keyword input from a user.

The units described herein may be implemented using hardware components, software components, or a combination thereof. For example, a processing device may be implemented using one or more general-purpose or special purpose computers, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations (e.g., parallel processors) are possible.

Software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. Software also may be distributed over network coupled computer systems so that software is stored and executed in a distributed fashion. In particular, software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular example embodiment, but where applicable, are interchangeable and can be used in other example embodiments, even if not specifically shown or described. The disclosed example embodiments can be varied in many ways. Such variations are not to be regarded as a departure from the disclosure, and all such modifications are intended to be included within the scope of the disclosure.

What is claimed is:

1. A non-transitory computer-readable medium storing a computer program, which when executed by a processor of an electronic device, configures the processor to perform a keyword search method, the keyword search method comprising:

displaying a plurality of instant messages transmitted and received through a conversation session on a screen of the electronic device through a messenger interface, the messenger interface being an interface configured to set the conversation session between a first account of a user of the electronic device and a second account of another user;

transmitting simultaneously at least two instant messages of the plurality of instant messages that are currently displayed on the screen to a server for a keyword search in response to an input of a single search instruction, the at least two instant messages including a first instant message from the first account of the user of the electronic device and a second instant message from the second account of the another user;

receiving a plurality of search results from the server, each of the search results generated based on each of keywords extracted from each of the transmitted at least two instant messages; and displaying the search results on the screen of the electronic device.

2. The non-transitory computer-readable medium of claim 1, wherein the transmitting comprises transmitting the at least two instant messages displayed on the screen of the electronic device to the server through the messenger interface at a point in time at which the single search instruction is input.

3. The non-transitory computer-readable medium of claim 1, wherein the keyword search method further comprises: receiving the single search instruction through a user selection on an area of the messenger interface.

4. The non-transitory computer-readable medium of claim 1, wherein the keyword search method further comprises: receiving the single search instruction generated based on an output value of a sensor included in the electronic device.

5. The non-transitory computer-readable medium of claim 1, wherein the displaying comprises displaying the search results on the screen of the electronic device in association with the messenger interface.

6. The non-transitory computer-readable medium of claim 1, wherein the displaying the search results further comprises providing a function of calling at least one process associated with at least some of the search results displayed on an area of the messenger interface in a form of a pop-up card.

7. The non-transitory computer-readable medium of claim 6, wherein the at least one process associated with the at least one of the search results includes at least one of a first process of connecting the at least one of the search results to a site associated with the at least one of the search results, a second process of playing back content associated with the at least one of the search results, or a third process of providing the at least one of the search results through the conversation session.

8. The non-transitory computer-readable medium of claim 1, wherein the transmitting further comprises:
transmitting user classification information to the server, the user classification information being information for classifying the at least two instant messages to identify respective users participating in the conversation session, and
assigning relatively high search priorities to an instant message of a specific user based on the user classification information.

9. The non-transitory computer-readable medium of claim 1, wherein the displaying further includes displaying the search results on the screen of the electronic device according to search priorities associated with respective users participating in the conversation session.

10. The non-transitory computer-readable medium of claim 1, wherein the keyword search method further comprises:
extracting the keywords from the transmitted at least two instant messages; and
automatically selecting a single meaning from among at least two meanings associated with a corresponding keyword of the extracted keywords, as a meaning matching the corresponding keyword, based on context of an instant message or a semantic tagging.

11. A keyword search method of an electronic device, the method comprising:
displaying a plurality of instant messages transmitted and received through a conversation session on a screen of the electronic device through a messenger interface, the messenger interface being an interface configured to set between a first account of a user of the electronic device and a second account of another user;
transmitting simultaneously at least two instant messages of the plurality of instant messages that are currently displayed on the screen to a server for a keyword search in response to an input of a single search instruction, the at least two instant messages including a first instant message from the first account of the user of the electronic device and a second instant message from the second account of the another user;
receiving a plurality of search results from the server, each of the search results generated based on each of keywords extracted from each of the transmitted at least two instant messages; and
displaying the search results on the screen of the electronic device.

12. The method of claim 11, wherein the transmitting comprises transmitting the at least two instant messages displayed on the screen of the electronic device to the server through the messenger interface at a point in time at which the single search instruction is input.

13. The method of claim 11, wherein the displaying comprises displaying the search results on the screen of the electronic device in association with the messenger interface.

14. The method of claim 11, further comprising:
extracting the keywords from the transmitted at least two instant messages; and
automatically selecting a single meaning from among at least two meanings associated with a corresponding keyword of the extracted keywords, as a meaning matching the corresponding keyword, based on context of an instant message or a semantic tagging.

15. A keyword search method of a server, the method comprising:
receiving, from an electronic device, at least two instant messages simultaneously transmitted through a conversation session set between a first account of a user of the electronic device and a second account of another user in response to an input of a single search instruction, the at least two instant messages being messages currently displayed on a screen of the electronic device;
extracting keywords from each of the at least two instant messages;
generating a plurality of search results using the extracted keywords; and
transmitting the search results to the electronic device.

16. The method of claim 15, further comprising:
selecting a number of keywords from among the keywords based on a query count associated with each of the keywords,
wherein the generating comprises generating the search results using the number of keywords.

17. The method of claim 15, wherein the receiving further comprises:
receiving user classification information from the electronic device, the user classification information being information for classifying the at least two instant messages to identify respective users participating in the conversation session, and assigning a relatively high priority to an instant message of a specific user among the respective users based on the user classification information.

18. The method of claim 15, further comprising:

selecting a single meaning from among at least two meanings associated with at least one keyword from among the extracted keywords; and matching the selected single meaning to the at least one keyword, wherein the generating comprises generating at least one of the search results corresponding to the selected single meaning matched to the at least one keyword.

19. The method of claim 18, wherein the selecting comprises selecting the single meaning for the matching based on a word included in the at least two instant messages.

\* \* \* \* \*